(12) United States Patent
Carpenter et al.

(10) Patent No.: US 7,543,529 B1
(45) Date of Patent: Jun. 9, 2009

(54) VERTICAL ROTISSERIE COOKING SYSTEM

(75) Inventors: Keith R. Carpenter, Everson, WA (US); Harry E. Hegarty, Bellingham, WA (US); Lawrence B. Johnson, Bellingham, WA (US)

(73) Assignee: Wood Stone Corporation, Bellingham, WA (US)

( * ) Notice: Subject to any disclaimer, the term of this patent is extended or adjusted under 35 U.S.C. 154(b) by 729 days.

(21) Appl. No.: 11/129,176

(22) Filed: May 13, 2005

(51) Int. Cl.
*A47J 43/18* (2006.01)
*A47J 37/06* (2006.01)

(52) U.S. Cl. ...................... 99/421 V; 99/378
(58) Field of Classification Search ....... 99/419–421 V, 99/444, 378, 400–404, 325–339
See application file for complete search history.

(56) References Cited

U.S. PATENT DOCUMENTS

| | | | |
|---|---|---|---|
| 1,762,035 A | 6/1930 | Soylian | |
| 1,790,488 A | 1/1931 | Saunders | |
| 2,012,702 A | 8/1935 | Zolotas | |
| 2,107,835 A | 2/1938 | Pierce | |
| 2,205,914 A * | 6/1940 | Stafford | 99/352 |
| 2,517,360 A | 8/1950 | Singer | |
| 2,549,019 A | 4/1951 | Saunders | |
| 2,565,786 A | 8/1951 | Spartalis | |
| 2,885,952 A | 5/1959 | Campbell | |
| 3,744,403 A | 7/1973 | Castronuovo | |
| 4,270,444 A | 6/1981 | Geissmann | |
| 4,366,750 A | 1/1983 | Brown et al. | |
| 4,590,848 A * | 5/1986 | Willingham | 99/339 |
| 5,106,642 A * | 4/1992 | Ciofalo | 426/509 |
| 5,575,196 A | 11/1996 | Masel et al. | |
| 6,487,964 B2 * | 12/2002 | Snoke et al. | 99/345 |

* cited by examiner

*Primary Examiner*—Sang Y Paik
(74) *Attorney, Agent, or Firm*—Michael F. Hughes; Hughes Law Firm, PLLC

(57) ABSTRACT

A vertical rotisserie open flame oven having a central flame post dispersing aesthetically pleasing flames and a secondary heater positioned outside the path of rotation of the food items. The oven has a central chamber area where the heat transfer to the food items is executed in a desirable manner to properly cook the food items without burning the surface thereof.

45 Claims, 20 Drawing Sheets

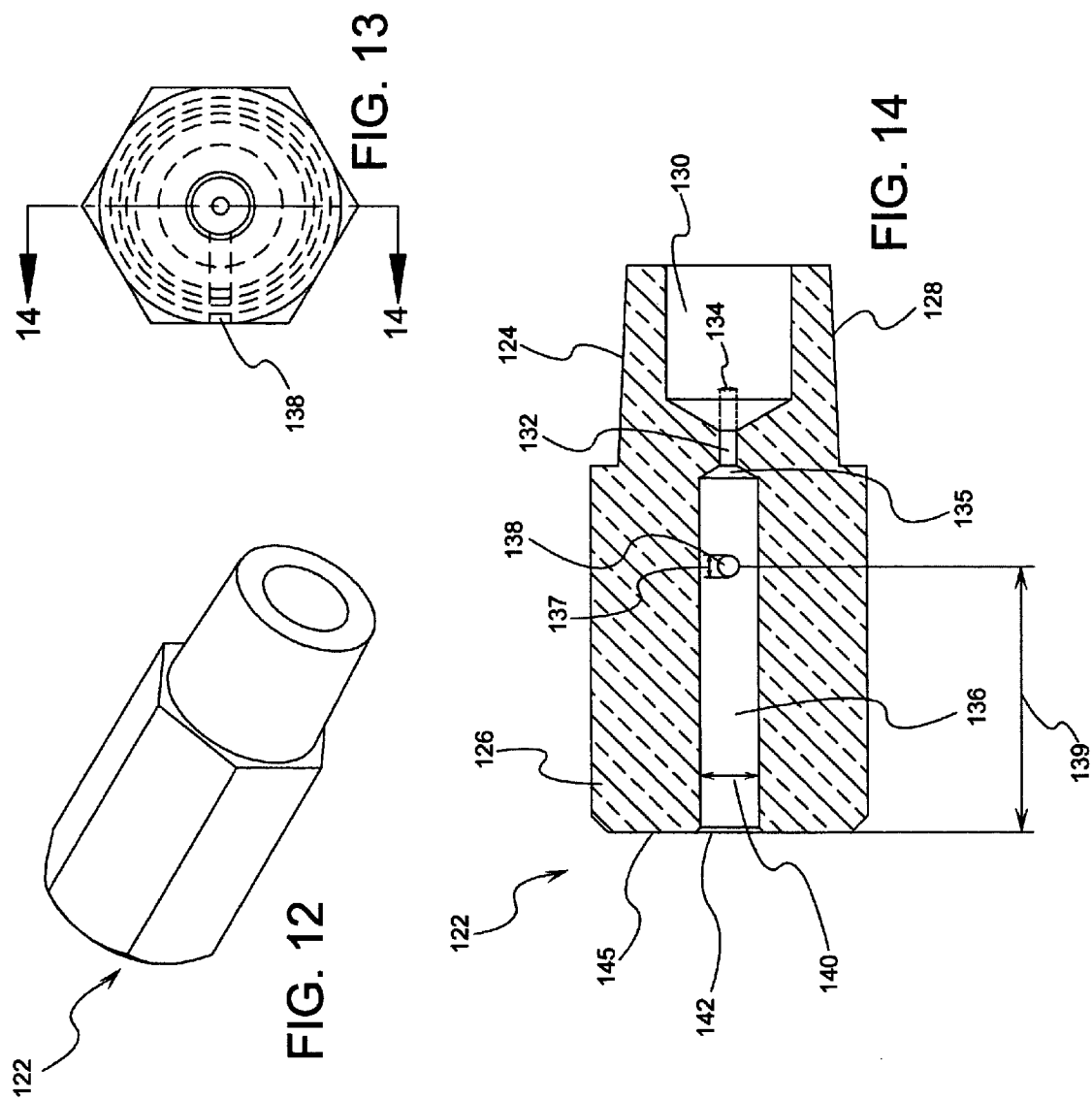

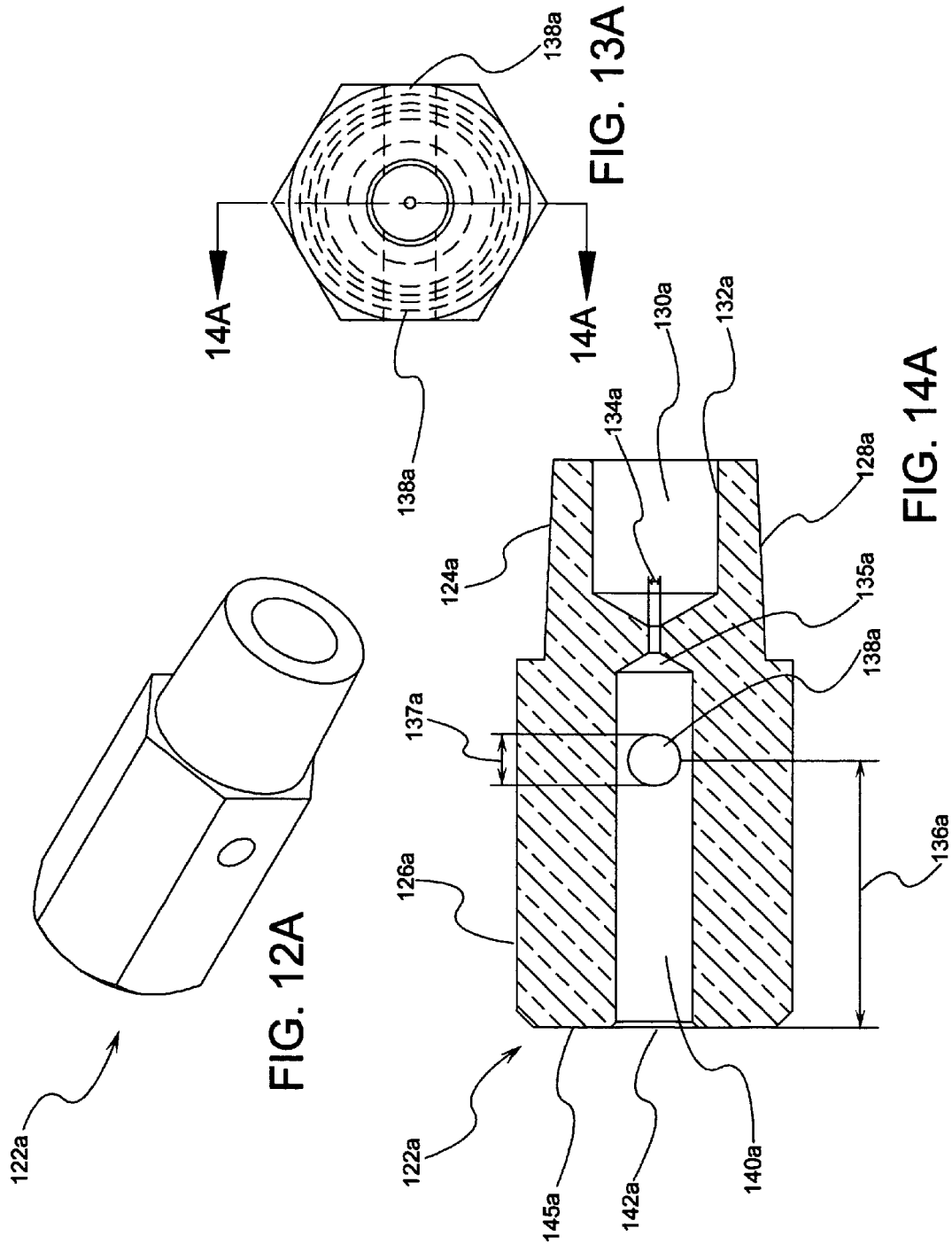

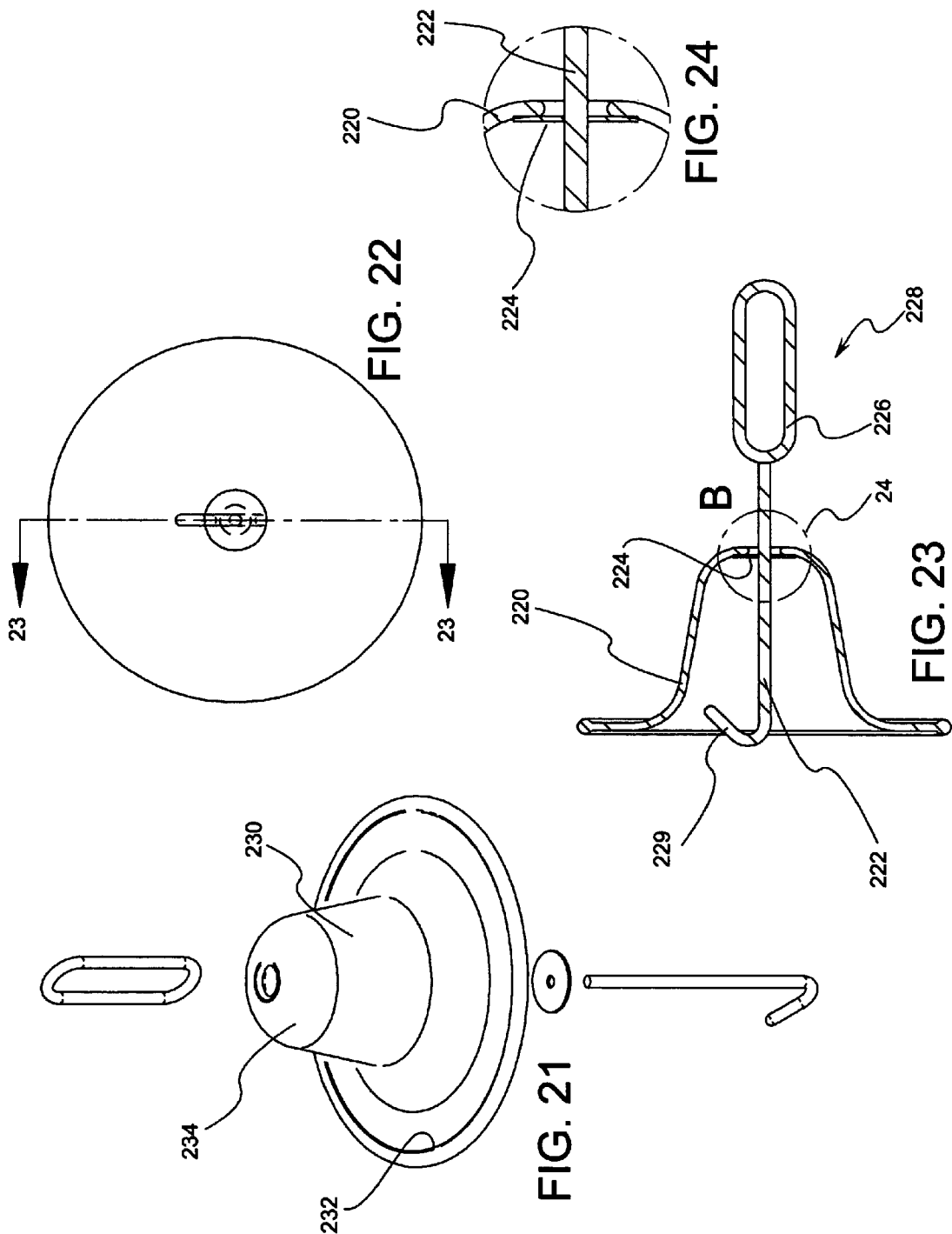

VERTICAL ROTISSERIE COOKING SYSTEM

BACKGROUND

Rotisserie cooking systems as shown in the prior art consist of various embodiments adapted to heat food items with some form of the heat source. Vertical rotisserie ovens are particularly challenging to construct in order to cook the food items evenly from the upper portion to the lower portion. Heat of course tends to rise making the upper food items cook more readily than the lower food items. Further, an open flame presents challenges in cooking where it is undesirable to have soot expelled therefrom on to the food items and have sufficient heat transfer to the food items to cook in a reasonable amount of time (e.g. approximately one hour).

Vertically orientated skewers as described herein are found to be particularly advantageous for preventing cross-contamination of food items. In other words, in rotisserie cooking systems that have laterally extending skewers of food items, in the course of rotating the items about a central lateral axis, the various food items are positioned above one another in a ferris-wheel whereby drippings can cause cross-contamination of the vertically orientated food items to the food items positioned thereunder.

A challenge with vertically orientated food items is ensuring a proper heat dispersion whereby natural convection currents cause a rising of the warm air within the cooking chamber. Further, it is found to be extremely desirable to have a central aesthetically pleasing flame. In general, there appears to be a human trait of innately appreciating a fire which may be rooted in our survivalist instincts. Just as fireplaces are common items in houses for their aesthetically pleasing value, an open flame cooking food is a nostalgic symbol of our basic survival. Cooking food items by a flame is likely the oldest method of food preparation executed by our ancestors. Therefore, it is very desirable to have a cooking system that incorporates a line of flame in conjunction with other heating elements to effectively and safely cook food items.

Of course for commercial or residential use, it is somewhat of a challenge to capture the heat transfer from open flame while needing various criteria for proper cooking. In general, it is desirable to have a unit that will properly cook food items such as whole chickens within a timeframe of about an hour. Further, a proper combustible fuel must be employed and utilizing a flame post for proper flame size in dispersion is necessary for complete combustion of the gas. Further, the heat transfer to the food items must be such that the there are not substantial temperature gradients from the innermost portion of the food items to the surface. In other words, it is undesirable to have a burnt upper surface and a raw inner portion.

Therefore, the embodiments presented below present a very desirable effective apparatus and method of cooking food items with an open flame about vertically orientated cooking skewers.

BRIEF DESCRIPTION OF THE DRAWINGS

FIG. 12 shows an isometric view of a flame jet for natural gas;

FIG. 12A shows an isometric view of a flame jet for liquid propane;

FIG. 13 shows a front view of the flame jet for natural gas;

FIG. 13A shows a front view of the flame jet for liquid propane;

FIG. 14 shows a sectional view of the flame jet taken at line 14-14 of FIG. 13;

FIG. 14A shows a sectional view of the flame jet taken at line 14A-14A of FIG. 13A for a liquid propane igniter jet;

FIG. 21 shows an exploded preassembled view of a skewers section;

FIG. 22 shows a top view of the skewer section;

FIG. 23 shows a sectional view of a skewer section taken at line 23-23 of FIG. 22;

FIG. 24 shows a close up of detail portion 24 as shown in FIG. 23;

DETAILED DESCRIPTION OF THE PREFERRED EMBODIMENTS

Figure 1A:
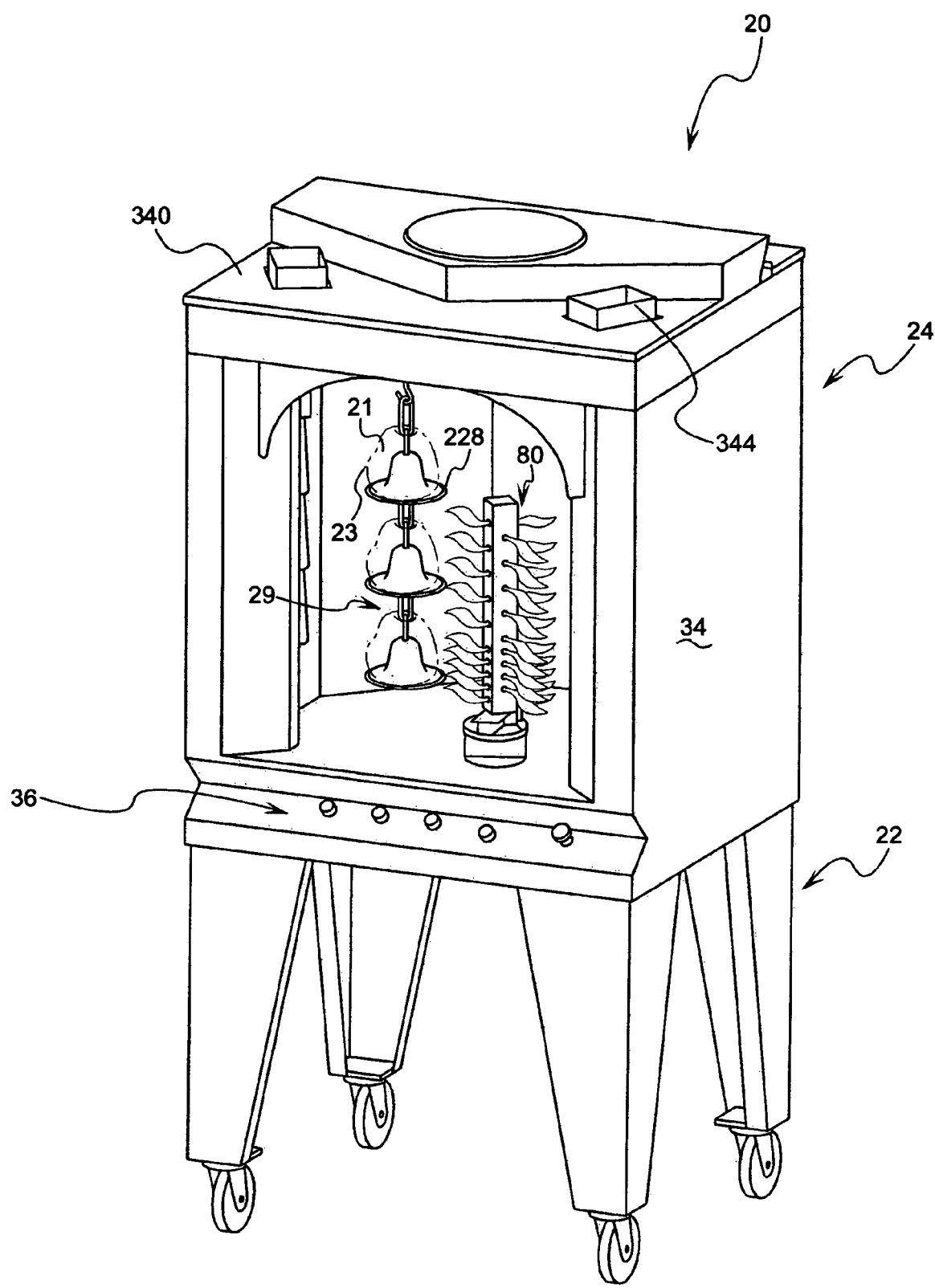
FIG. 1A shows an isometric view of the open flame rotisserie oven.

As shown in FIG. 1A, there is an isometric view of the vertical rotisserie oven 20. To aid in the description an axes system 10 is defined where the axis 12 indicates the vertical direction, the axis 14 indicates a lateral direction and the axis 16 indicates a transverse direction where the arrow of axis 16 indicates a forward direction with respect to the oven 20. It should be noted that the various axes are for reference purposes to aid in the description of the general orientation of the components described herein.

As further shown in FIG. 1A, the oven 20 comprises a base portion 22 and an operational portion 24. The base portion 22 in one form comprises a plurality of support legs 26 having casters 28 rotationally positioned thereunder. The base portion generally fits within the footprint generally indicated by the hatched line 30A-30D, positioned in the extreme forward- and rearward-most portions in the transverse direction (at locations 30A and 30B) which is 36" in one form and further positioned at the extreme locations on the left and right lateral regions (indicated at 30D and 30C respectively) which is 30 inches in one form. Of course these dimensions can alter but it is desirable to have the unit in a specific footprint at the prescribed dimensions or less that is easily suitable to fit into a cooking facility such as a commercial kitchen. It should be noted that the footprint of the oven is such that it is retrofittable to conventional cooking operations that generally allow a certain amount of real estate for such devices. As described further below, the footprint is a potential limiting factor for the size of the chamber region of the oven where the size of the chamber region affects the cooking dynamics of food items as described further below.

The operational portion 24 comprises an encasement 34 which in one form is made of stainless steel, as are the support legs 26.

Figure 5:
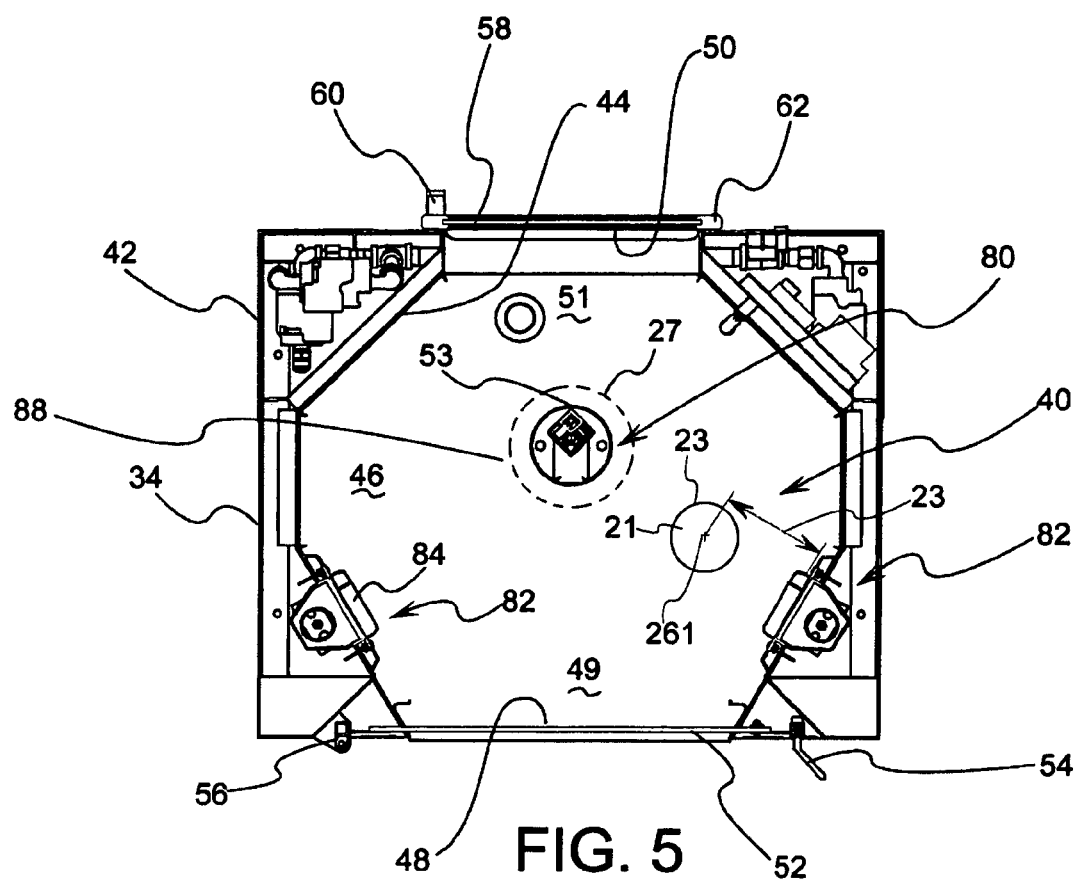
FIG. 5 shows a top cross sectional view of the oven looking down upon the central cooking chamber.

The operational portion 24 in general comprises a control interface 36, a drive assembly 38, and as shown in FIG. 5, a heating assembly 40.

As shown in FIG. 5, the upper housing 42 is cross-sectionally shown. In general, the upper housing 42 comprises the encasement 34 which as described above in one form is at least partially made of stainless steel for sanitary and aesthetic reasons. The upper housing 42 further comprises an interior surface 44 which is adapted to define a central chamber 46. The central chamber (cooking chamber) 46 in one form is substantially enclosed where the central chamber partially defined the central cooking area which need not be substantially enclosed. The interior surface 44 is partially comprised in one form of a forward glass surface 48 and an optional rearward glass surface 50. In general, the glass surfaces 48 and 50 allow visible inspection of the food items cooked therein. In one form, the transverse forward region where the forward glass surface 48 is positioned is displayed to the public. In a commercial setting this would be to potential purchasers in a grocery store or perhaps to patrons a restaurant. The rearward glass surface 50 allows for visual inspection by, for example, a chef or other culinary technician responsible for the food items. The forward glass surface 48 is part of a glass door 52 having a handle portion 54 and hingeably attached at region 56 as shown in FIG. 1. In a like manner, the rearward glass surface 50 in one form is a part of a door 58 further having a handle 60 and hingeably attached at location 62 as shown in FIG. 5. In one form, the door 58 can be a double-paned glass door to provide additional insulation. The doors may be attached at various locations on the housing and in other forms a single door may be employed. Further, if heat can be maintained in the central cooking area than in certain forms a door may not be required.

The chamber 46 comprises low radiant energy zone 51 and a high radiant energy zone 49. In general, the left and right secondary heaters 84 and 86 in one form provide infrared heat which is radiant heat to the food items passing thereby. The low radiant energy zone 51 is defined as a region within the chamber area 46 (in a preferred form) that is not near the secondary heat source. In general, the secondary heat source (left and right infrared heaters 84 and 86) provide a browning to food items such as chickens. Present analysis indicates that in one form of carrying out the preferred embodiment, the temperature in the low radiant energy zone 51 is similar if not higher than the forward portion of the chamber 46. However, the tendency for the heat transfer from the heaters 84 and 86 tends to be more concentrated heat source that decreases with respect to the distance therefrom. Therefore, the low radiant energy zone 51 provides for a "heat soak time" were the warmer exterior surface of the food item is allowed to transfer the heat into the interior portions of the food item. As specified by certain food regulatory codes, the interior portion of the food items such as a chicken must reach a preset temperature (e.g. 165° F.). It is generally not a challenge to have the surface of any food item at any temperature but having the heat transfer to the interior portion is occasionally problematic. However, the low radiant energy zone provides for a heat soak time to allow the heat to transfer from the exterior portion of the food item to the interior portion of the food item and as the food item passes to the high radiant energy zone 49, the surface of the food item is again receiving radiant heat and browned.

As shown in FIG. 5, the food item 21 has an outer surface 23 where the skewer axis 261 in a preferred form is indicated at dimension 25. This dimension in a broader range is approximately 10-5 inches in distance. A 20 more preferred range is between 8.5 and 6.5 inches with a most preferred distance of approximately 7.5 inches plus or minus a half inch or so. Further, in a preferred form, the skewer axis 261 is an approximate equal distance from the flame dispersion region indicated at 27 and the secondary heaters 82.

Figure 2:
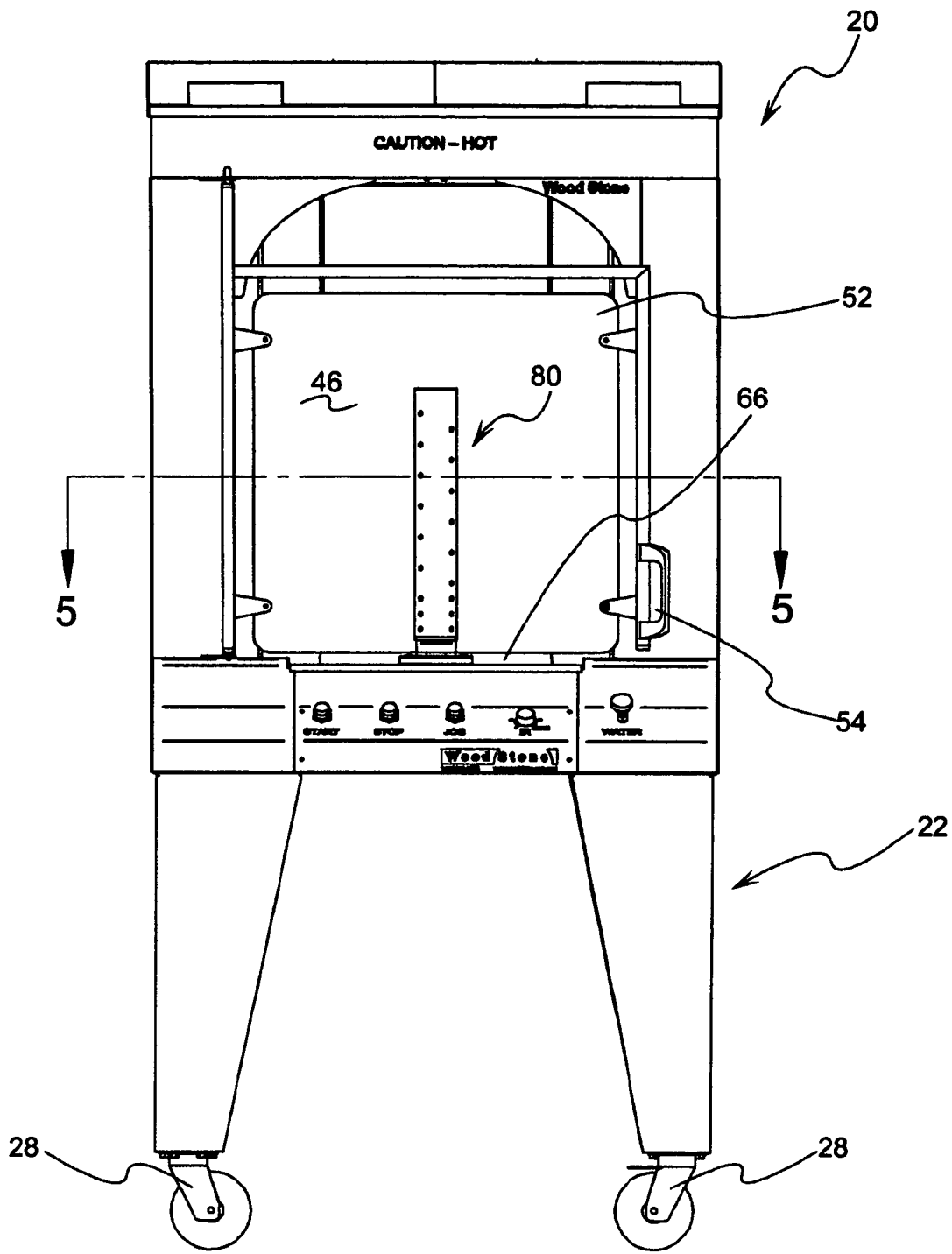
FIG. 2 shows a front view of the oven where the control interface is shown as well as the flame post contained in the central chamber area of the oven.
Figure 3A:
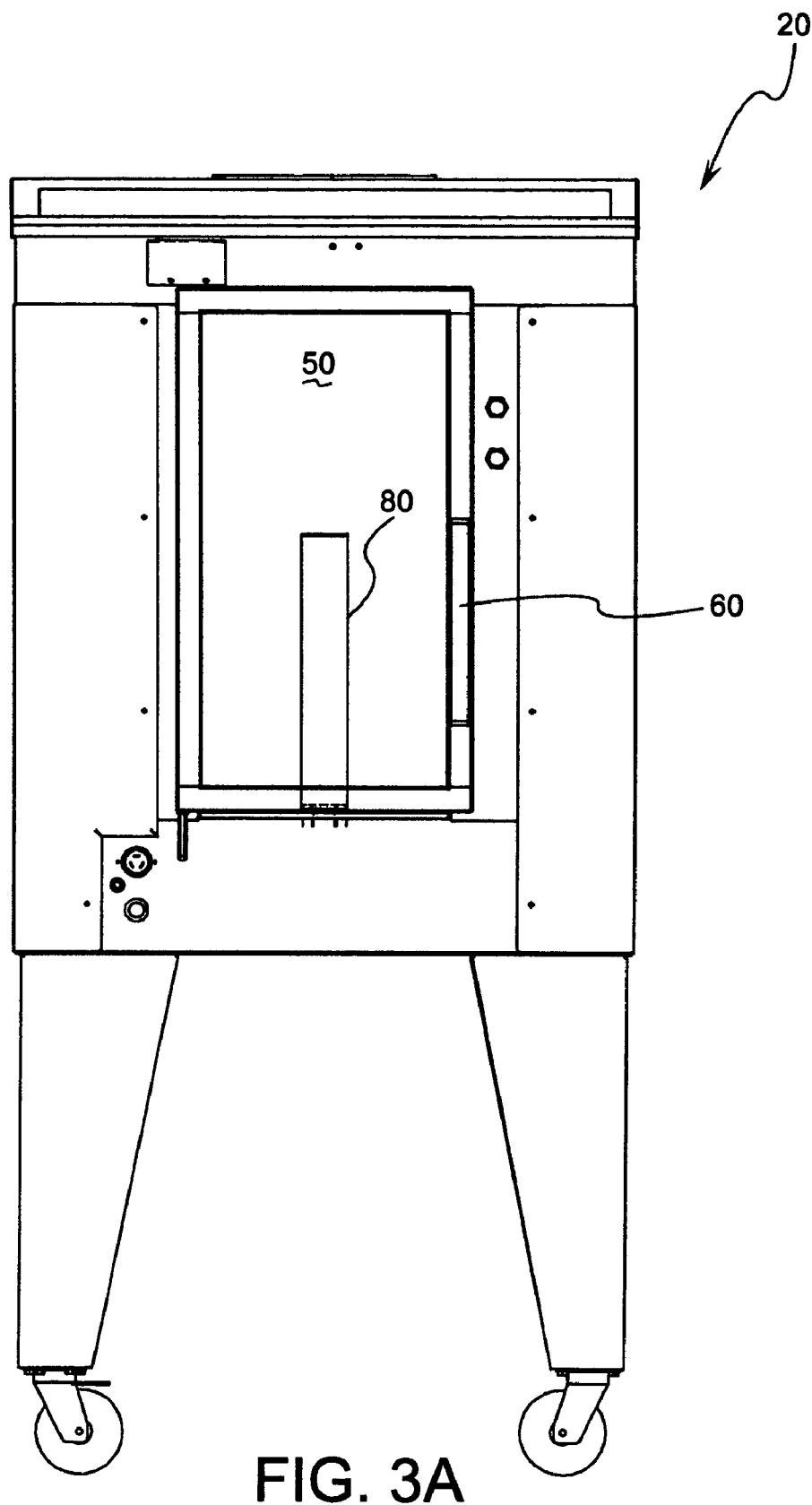
FIG. 3A shows a rear view of the open flame oven having an optional rearward access.
Figure 3B:
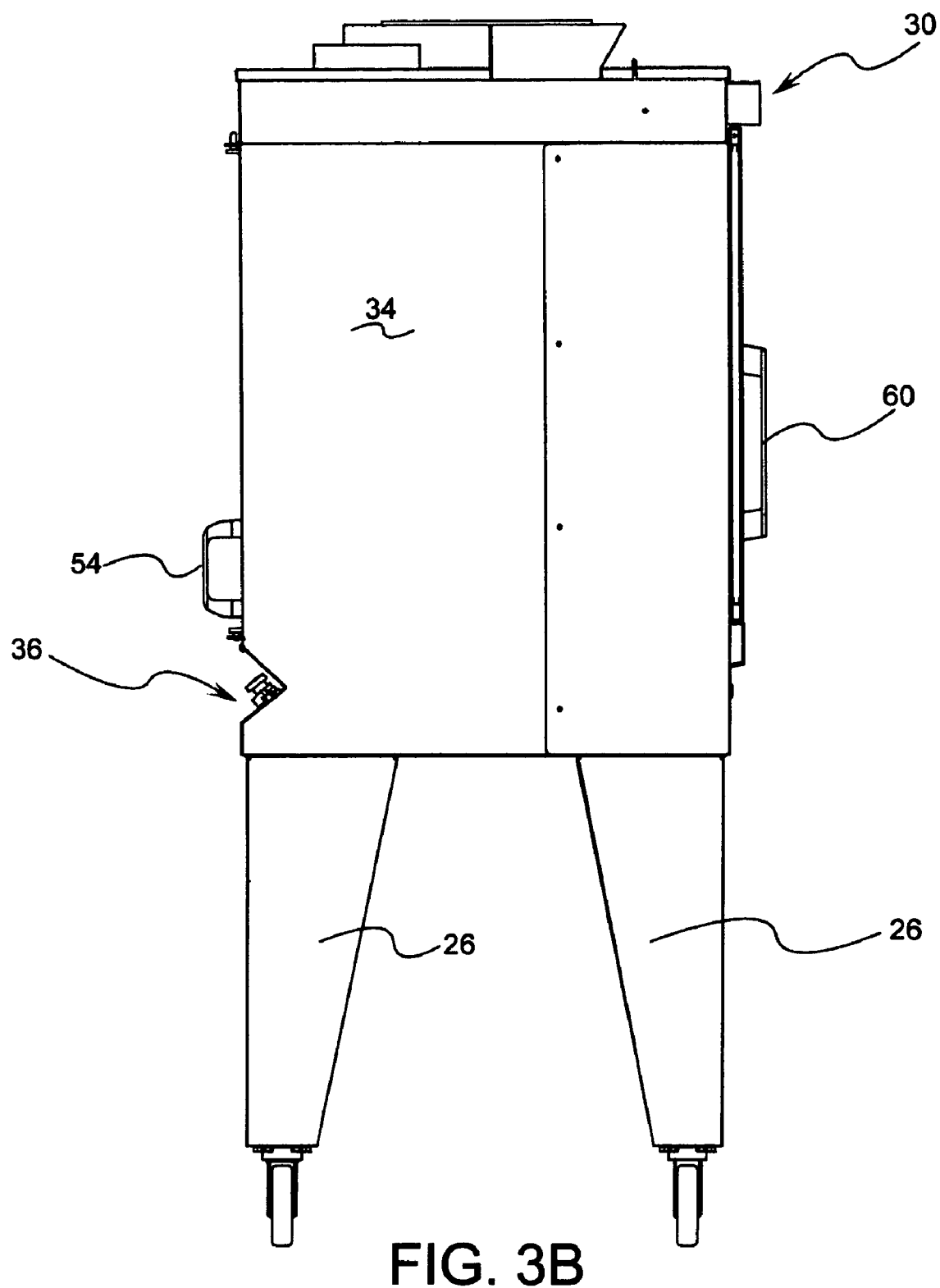
FIG. 3B shows a side view of the oven.
Figure 4A:
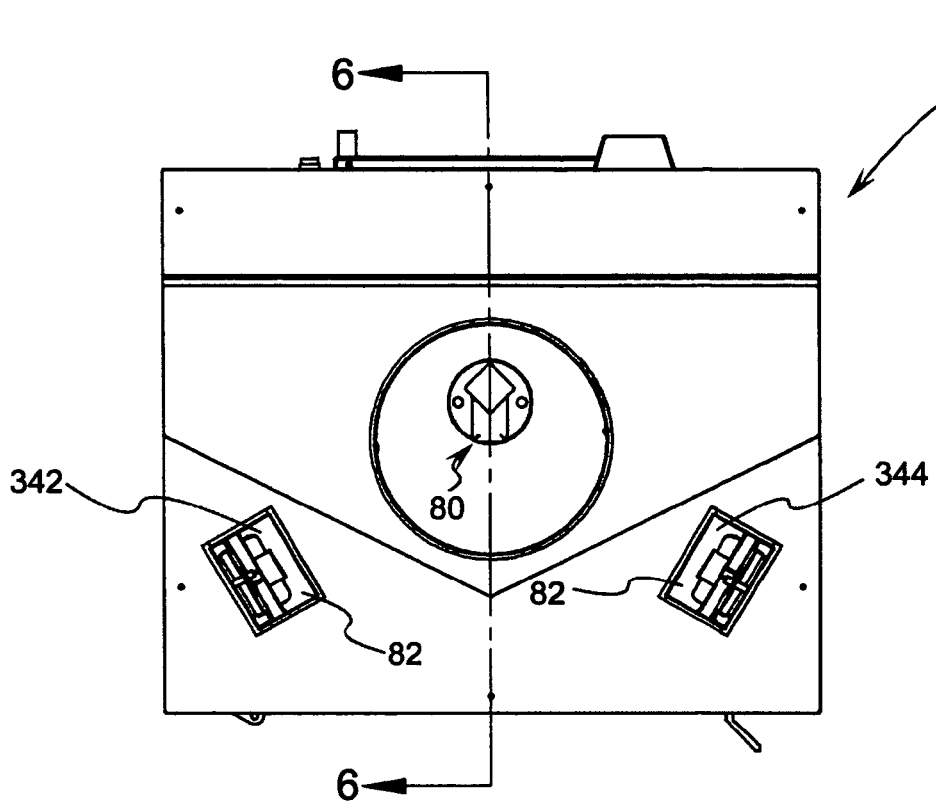
FIGS. 4A and 4B show top and bottom views of the oven respectively.
Figure 4B:
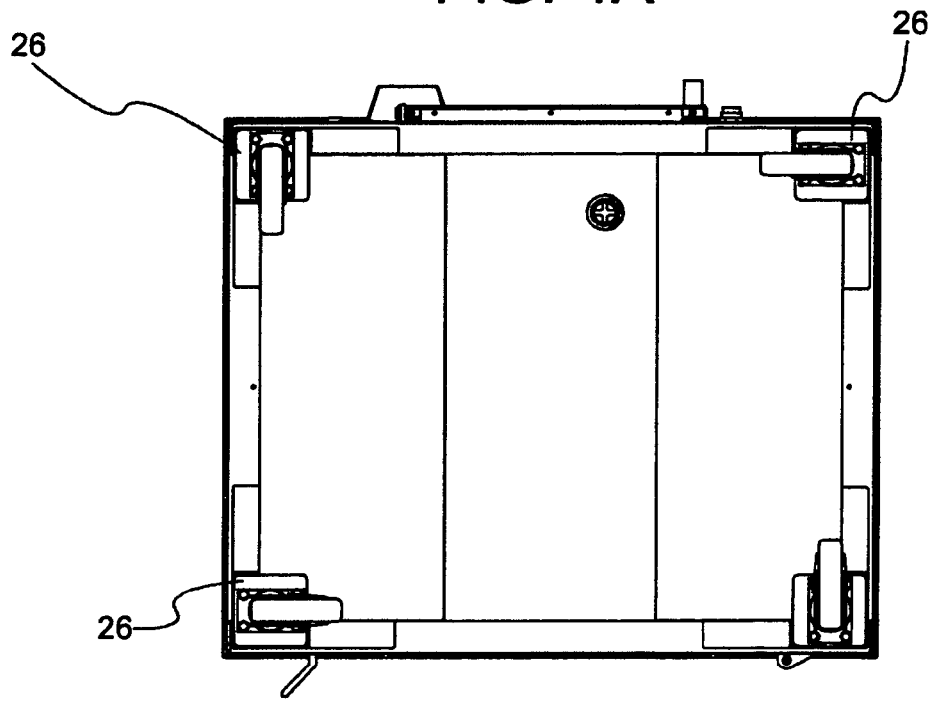

Now referring to FIG. 2, located in the lower portion of the central chamber 46 is a water entrapment region 66. In one form, the water entrapment region 66 is adapted to receive drippings from the food items where a certain height of water is positioned in the region 66 such as between a 0.5 and 1.5 inches. The water contained in this lower portion further has a benefit of increasing the relative humidity within the chamber 46 which can aid in cooking the food items to prevent dehydration of the same.

Figure 6:
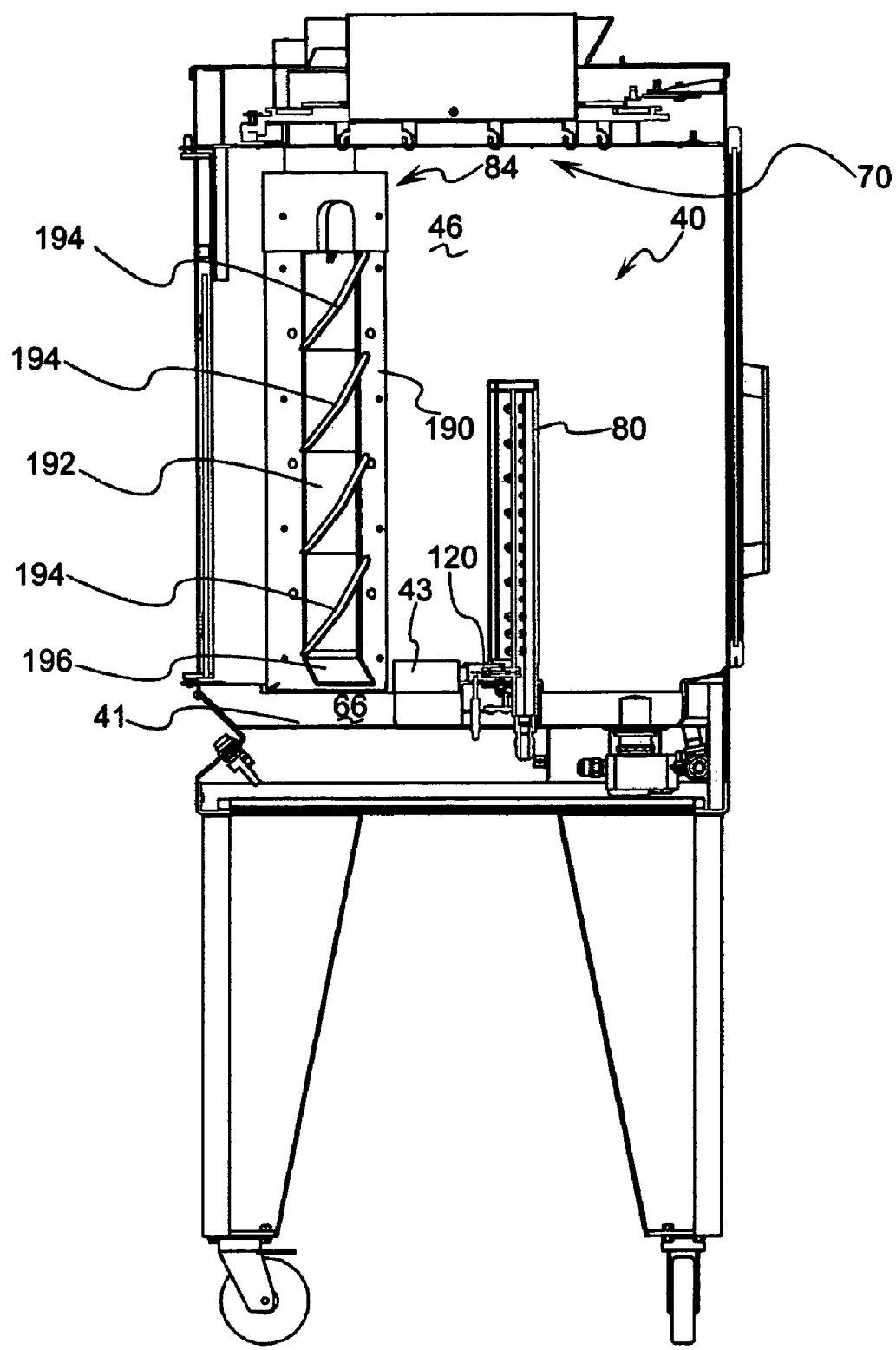
FIG. 6 shows a side cross-sectional view looking at the cooking chamber and a portion of the heating assembly comprising the central flame post heater and a secondary heater.

As shown in FIG. 6, located in the upper portion of the central chamber 46 is the food attachment assembly 70 which is adapted to have skewers hang therefrom. The term skewer is defined broadly to include any member adapted to support food items. As described herein the chicken/heating bells assembly are one form of a skewer. The food attachment assembly as described further herein is a portion of the drive assembly 38 and operatively connected thereto. FIG. 1A shows the oven without the front door where a skewer 227 is shown. As described further below, when the food items consist of chickens or other food items with a central open cavity, the heating bells 230 of the skewer items 220 described below with reference to FIGS. 21-24. In normal operation, skewers 29 are within the oven with several food items hanging therefrom (see FIG. 1A for an example of one skewer). It should be noted that the vertically orientated rotisserie allows for different food items on different skewers to be positioned within the central cooking chamber of the oven because the drippings will not cross contaminate in the same manner as a horizontally aligned skewer.

FIG. 6 further shows an additional attachment were a lower central portion of the chamber 46 there is a optional wood chip container 43 that is adapted to rest upon the lower floor 41 above the water entrapment region 66. In general, the wood chip container 43 is adapted to extract heat from the igniter jet/pilot jet 120 that is shown in greater detail in FIGS. 15-17. Essentially, the wood chip container is adapted to combust wood chips contained therein to provide a smoking flavor for the food items such as chickens. The wood chip/smoking container 43 is completely optional and shown in FIG. 6 as an optional addition that an operator can employ. There is an adjustment feature where pulling the wood chip container 43 forwardly away from the flames reduces the rate of combustion of the wood chips contained therein and hence the smoke produced.

There will now be a discussion of the heat assembly 40 with initial reference to FIG. 5. In general, the heat assembly 40 comprises a first heating element 80 and a second heating element 82. In general, a first and second heating element arrangement has been found to be advantageous for properly cooking food items such as whole chickens. The first heating element 80 is a flame post adapted to espouse aesthetically pleasing flames therefrom. The second heating element which in a preferred form comprises left and right infrared heaters 84 and 86 is positioned outside the rotational path of the food items indicated by the hatched line 88. The particulars of the rotational path 88 and method of cooking will be described in further detail following the operational discussion of the first and second heating elements 80 and 82. A preferred form of positioning a second heating 182 is outside of the path of travel of the food items. However, it perhaps could be feasible to position the secondary heater such as an infrared heater on the rearward portion 53 of the first heater/flame post 80 as shown in FIG. 5.

Figure 8:
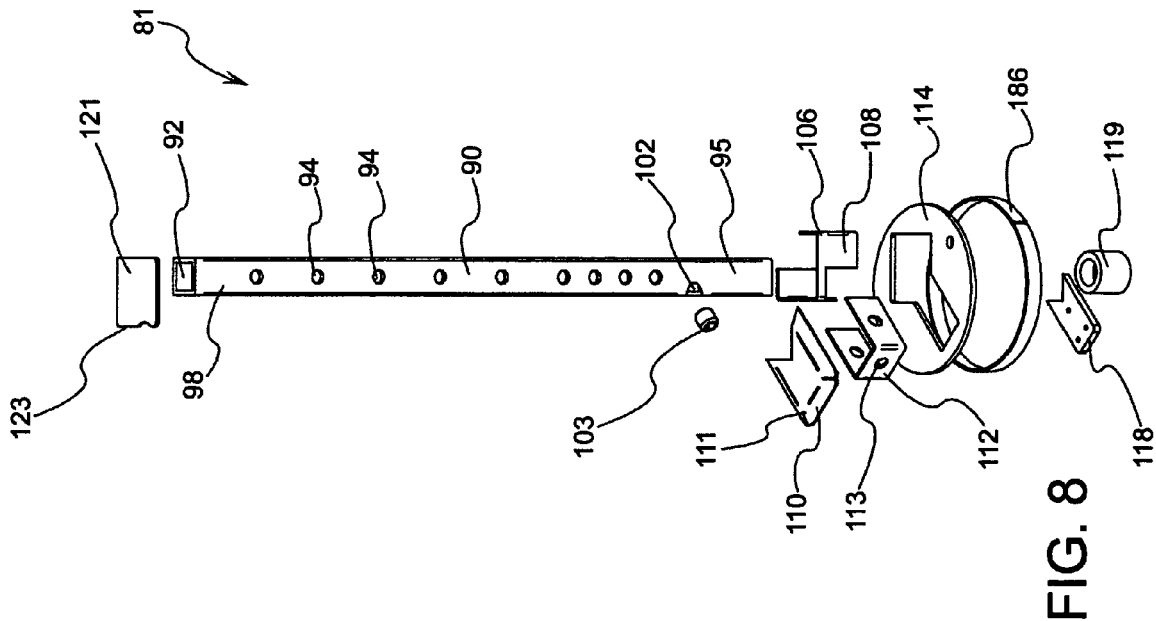
FIG. 8 shows the internal structure of the flame post in an exploded preassembled state.
Figure 7:
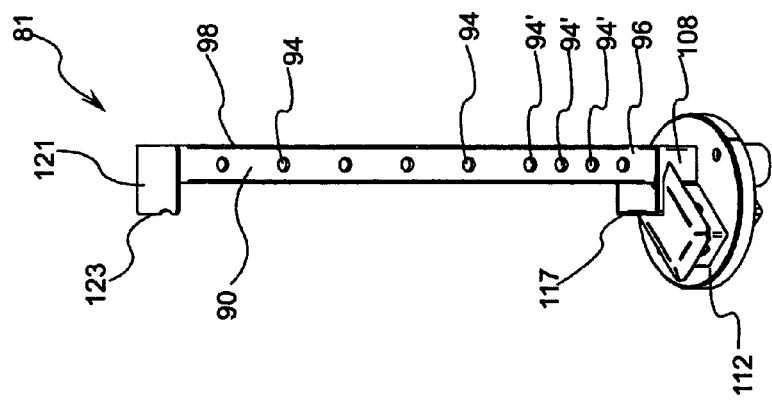
FIG. 7 shows an internal structure to the flame post.
Figure 9:
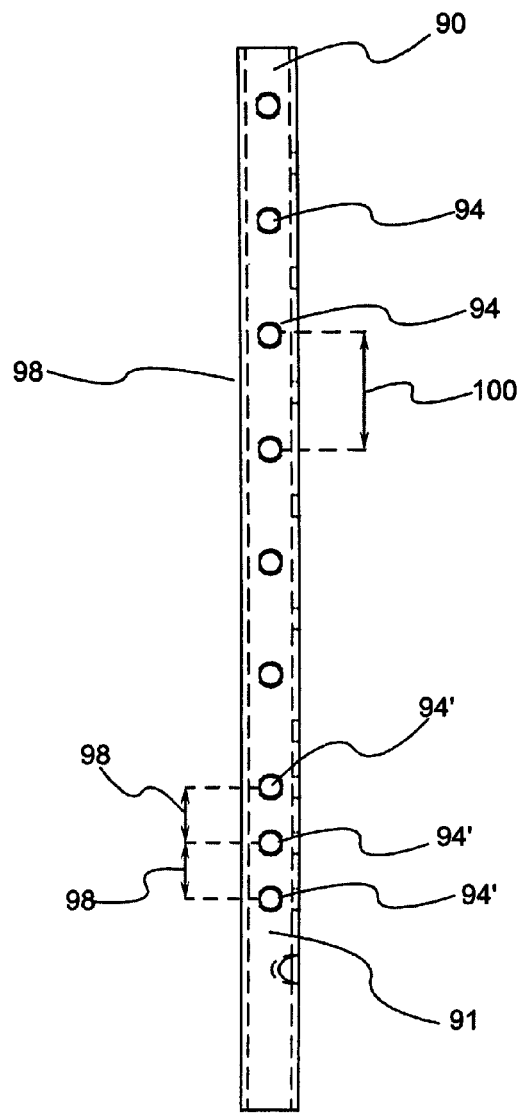
FIG. 9 shows a side view of the internal manifold showing the spacing of the various openings adapted to receive nozzles.
Figure 11:
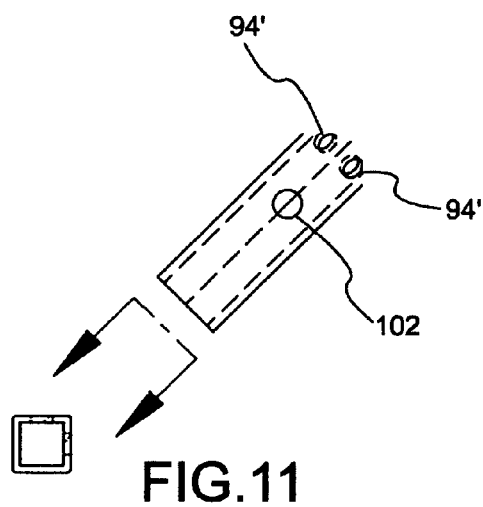
FIG. 11 shows a close up view of an oblique opening adapted to mount a starter nozzle therein.
Figure 10:
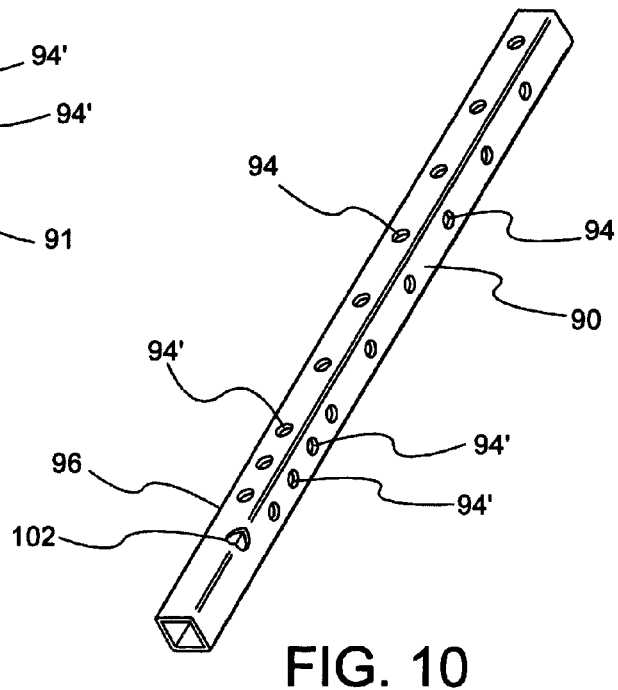
FIG. 10 shows an isometric view of the internal manifold illustrating the staggered positioning of the openings that are adapted to receive flame dispersion nozzle jets.
Figure 15:
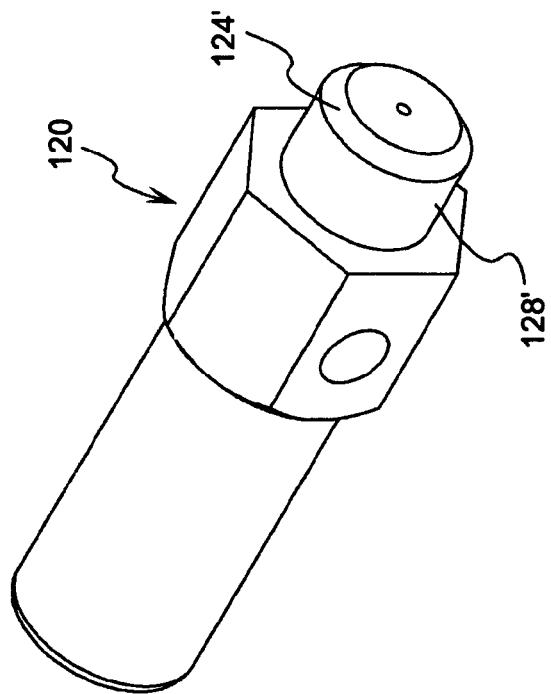
FIG. 15 shows an isometric view of an igniter/pilot jet.
Figure 16:
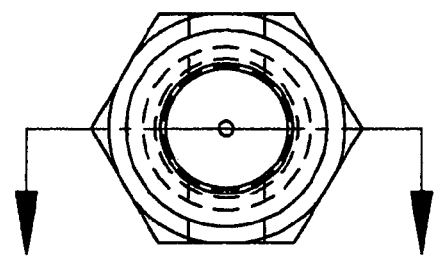
FIG. 16 shows a front view of the igniter jet.

As previously stated, the first heating element 80 is a flame post centrally positioned within the chamber 46 as shown in FIG. 5. Referring now to FIGS. 7 and 8, there is shown a preferred form that comprises a portion of the first heating element 80 (the flame post). The flame post 80 comprises an internal manifold 90 which is substantially vertically orientated having an interior open chamber area 92 as shown in FIG. 8. A plurality of openings 94 are provided that are adapted to allow gas to pass therethrough. The internal manifold 90 has a lower region 96 and an upper region 98. Positioned in the lower region 96 are lower openings 94' that as shown in FIG. 9 have a vertical distance orientation indicated by dimension 98 which in a preferred form is 1 inch spacing and present analysis indicates a possible preferred range between 0.75 and 1.25 inches. The upper openings 94 positioned in the upper region 98 of the internal manifold 90 are generally positioned a vertical distance from one another, with said distance indicated at 100 at a preferred distance of 2 inches where present analysis indicates the range could be between 1 and 2.5 inches. Of course the jets are staggered where the vertical location of opposing jets on the adjacent angled surface is half of the staggered distance mentioned above. Further, as shown in FIG. 10, located in the lower region 96 an oblique opening 102 is provided to mount an igniter jet 120 as shown in FIG. 15 and discussed in detail below. As shown in FIG. 11, the oblique opening 102 in one form is positioned approximately at an equidistant location in the horizontal plane with respect to the lower openings 94'. As is further shown in FIGS. 10 and 11, in one preferred form, the lower openings 94 are generally positioned on the right and left lateral sides of the internal manifold 90 generally substantially in the same horizontal plane. However, the left and right upper openings 94 are orientated in an offset manner where in one form the one side of a single opening is interposed between the opposing and opposite adjacent openings. This is found to produce a desirable flame distribution for aesthetic and functional reasons.

Figure 18:
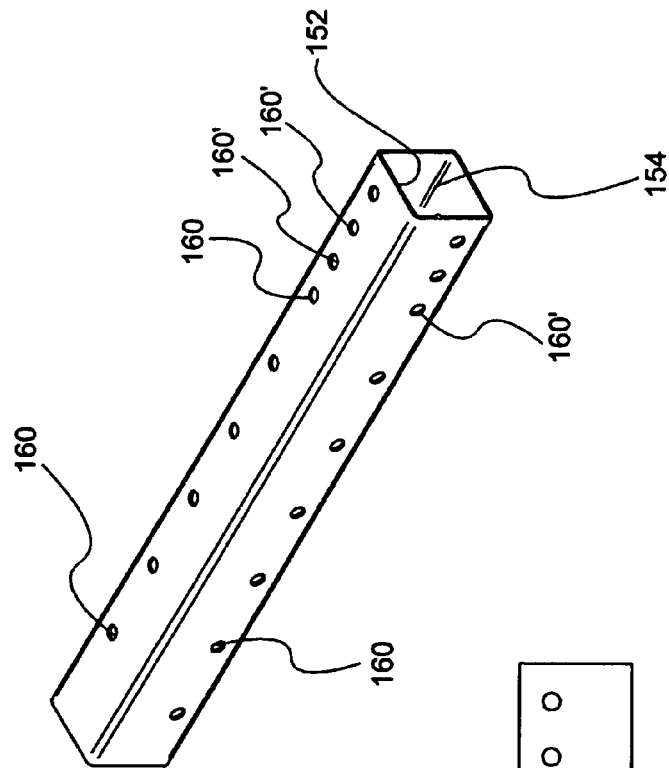
FIG. 18 shows an isometric view of the external manifold.

Referring now back to FIG. 8, one form of comprising the internal structure 81 of the first heating element 80 is shown in an exploded view. Normally the various components in the lower portion of FIG. 8 are fixedly attached to one another by a method such as welding. In general, a lower housing arrangement 106 is provided which functions as an air intake portion where the lower mount 108 is fixedly attached to the lower region 96 of the internal manifold 90. The lid 110 is fixedly attached to the lower portion 106 as well as the panel 112. The panel 112 is attached to the lower mount 108 and further attached to the lower base plate 114. The perimeter ring 186 is attached to the perimeter region of the lower base and the extension 118 assists in providing a hermetic seal between the gas outlet 119 to the interior chamber 92 of the internal manifold 90. The lid 110 is comprised of a perimeter sloping portion 111 that is adapted to divert grease and splatter from food items away from the surface defining flame dispersion openings 113 described further below. The upper portion of the internal structure 81 comprises a position 121 that is fixedly attached to the upper portion 98 and provides a hermetic seal to prevent gas escaping from this region. In general, the gas passing inward from the gas outlet 119 is adapted to be directed out the openings 94 (including 94' as well as the opening 102). Attached to the oblique opening is an ignition mount 103 adapted to mount the igniter jet 120 as shown in FIG. 15. The lower housing 108 has an upper perimeter lip 117 having an outer surface which approximately corresponds to the outer surface 123 in position and vertical alignment and is adapted to mount the external manifold 150 as described and discussed below referring to FIG. 18. FIG. 7 shows the assembled internal structure 81. In one form, this is a unitary unit where the various components as described above referring to FIG. 8 are rigidly assembled. The ignition mount 103 is adapted to extend to the interior chamber of the panel 112, and as described further herein, cooperate with the igniter jet 120 for the purpose of igniting the flame post as well as providing an additional heat source to the lower region of the chamber 46 (as shown in FIG. 6).

Now referring to FIGS. 12-14, the flame jet 122 is shown. The flame jet 122 is adapted to have a combustible gas pass through the central area and mix with air to provide a desirable combustible flame. Referring to FIG. 14, the flame jet 122 is cross-sectionally shown where the flame jet comprises a base region 124 and a forward region 126. The base region 124 comprises an outer surface 128 that is adapted to removably and fixedly engage the openings 94 and 94' as shown in FIG. 7. In one form, the outer surface 128 comprises a male threading adapted to threadedly engage a corresponding female threaded surface located on the perimeter regions of the openings 94 and 94'. Further positioned in the base region 124 is a gas inlet chamber 130 that is in communication with the flow control orifice 132.

With reference to FIGS. 12, 13 and 14 as well as 12A, 13A and 14A, there are respectively shown preferred nozzles for natural gas and liquid propane in each of these drawing sets. Referring to the cross sectional view in FIG. 14, the delivery chamber 136 is essentially a mixing chamber to mix the combustible gas with air. The diameter indicated at 140 for natural gas is 0.1065 inches in a preferred form. Present analysis indicates that this value could vary +/− up to 0.030 in. in a broader range and 0.015 in. +/− in a more narrow range.

The diameter 134 of the flow control orifice 132 has a desired value in FIG. 14 of 0.031 in. which has been found to have a preferred amount of flow given the standard pressures of natural gas. In the broader range, this may vary +/−0.010 in. for broader range and perhaps +/−0.005 in. for a more preferred range as indicated by present analysis.

One additional component is the air inlet 138 and its diameter. The air inlet 138 allows for the air to mix within the chamber portion 136. The diameter indicated at 137 for natural gas as shown in FIG. 14 for this opening is approximately 0.039 in. where the broader range of values could be 0.035 up to 0.050 in. It should be noted that additional oxygen will create a bluer flame which may not be desirable. Insufficient oxygen does not allow the flame to combust prior to engaging the food item which can cost soot to be deposited upon the food item. It should be noted that although it is preferred to have cylindrical openings for purposes of manufacture, equivalent other structures for openings could be employed having similar flow characteristics for the various openings.

Finally, the barrel length as indicated by dimension 139 allows for mixing of the gas. A preferred distance to allow for proper mixture is approximately one half of an inch. Present analysis indicates that the dimension 139 in a preferred range would be between ⅜ of an inch to 1 in.

There will now be a discussion of a similar nozzle as that as shown in FIGS. 12-14 but is specifically designed for liquid propane.

Referring to the cross sectional view in FIG. 14A, the delivery chamber 136a is also a mixing chamber to mix the liquid propane gas with air. The preferred diameter indicated at 140a for liquid propane is 0.1405 inches in a preferred form. Present analysis indicates that this value could vary +/− up to 0.050 in. in a broader range and 0.030 in. +/− in a more narrow range. The diameter 134a of the flow control orifice 132a has a desired value in FIG. 14A of 0.021 in. which has been found to have a preferred amount of flow given the standard pressures of liquid propane gas. In the broader range, this may vary +/−0.008 in. for broader range and perhaps +/−0.002 in. for a more preferred range as indicated by present analysis. The air inlet 138a allows for the air to mix within the chamber portion 136a. The diameter indicated at 137a for natural gas as shown in FIG. 14A for this opening is approximately 0.096 in. where the broader range of values could be from 0.085 in. to 0.120 in. It should be noted as shown in FIG. 13A that in a preferred form there are actually two air inlet holes. In general propane tends to burn slower and pack more BTUs per unit of weight than natural gas. Therefore the propane nozzle has a smaller flow control orifice 132a than orifice 132 and larger air intakes 138a than the intakes 138 (see FIGS. 14A and 14 respectively). The length of the mixing chamber is similar to the natural gas nozzle.

It should be noted that the inventor's have expended considerable time determining proper dimensions for the two most popular combustible gases which include natural gas and liquid propane. FIGS. 12A-14A shows another to scale drawing for liquid propane. It should be noted that the various exact dimensions are the preferred form of carrying out the invention through testing and evaluation. The ranges are estimated ranges indicated only by present analysis. Of course certain extreme values in the ranges may not produce desirable results and one skilled in the art should first attempt the suggested values for the various diameters of the nozzles for most desirable results although there are most likely other possible combinations of dimensional values to produce desirable flame results.

It should be noted that a significant deviation in the orifice size not only affects the area of the orifice to the square, but further is affected by a plurality of orifices, such as eighteen, which has a fairly significant impact on the BTU throughput. The above-noted diameters are for natural gas or propane in a preferred form. However, it is recognized that other forms of combustible gas could be employed in the broader scope.

The flow control orifice 132 is in communication with the delivery chamber 136. Positioned in the rearward portion of the delivery chamber about 0.25 inches downstream of the orifice opening 135 is a surface defining an air inlet 138. Air is drawn in through the air inlet 138 by a venturi-like effect which is well known in flame jet disciplines. The diameter 140 of the delivery channel 136 in one form is about 0.14 inches and the delivery chamber 136 has a slight beveled portion 142 in the forward-most region. The forward region 126 of the flame jet 122 comprises an engagement surface is adapted to engage the interior surface of the external manifold 150 as described below with reference to FIG. 18.

Figure 17:
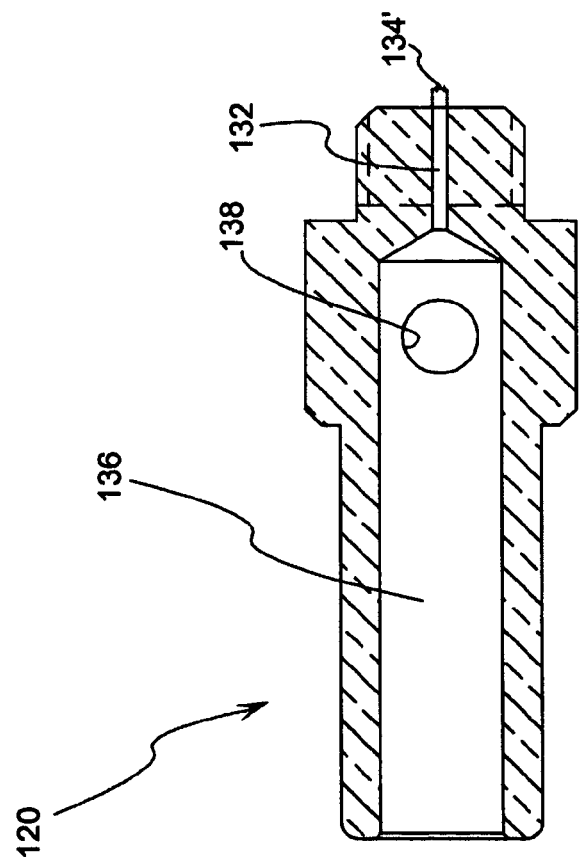
FIG. 17 shows a cross sectional view of the igniter jet taken at line 17-17 of FIG. 16.

Now referring to FIG. 17, the igniter jet 120 is similar to the flame jet 122 and similar regions are noted with similar numerals except followed by a "' (single quote)" symbol. FIG. 15 shows an isometric view of the igniter jet 120 where the base region 124' has an outer surface 128' that is adapted to be threadedly engaged to the ignition mount 13 as shown in FIG. 8 and discussed above. The flow control orifice 132' is in communication with the delivery chamber 136' having an air inlet 138' to facilitate mixture of combustible gas with the air. In one form, the diameter 134' of the flow control orifice 132' is 0.028 inches for natural gas and 0.0465 inches for propane.

There will now be a discussion of the external manifold 150 which completes the assembly of the flame post 80 (i.e. the first heating element) along with the internal structure 81 as shown in FIG. 7, and the plurality of flame jets 122 and igniter jet 120 shown in FIGS. 12 and 15. In general, the external manifold 150 is comprised of a heat resistant material such as metal and formed with an interior surface 152 having a cross-sectional horizontal plane profile that is adapted to match the exterior perimeter portion 123 of the position 121 (see FIG. 7), as well as the external perimeter region 117 of the lower mount 108. In general, the external manifold 150 is adapted to be removably attached to the internal structure 81 as shown in FIG. 7. The interior portion of the external manifold defines an internal chamber 154 adapted to have the internal manifold 90 with a plurality of jets attached thereto positioned within the internal chamber 154. The external manifold has surfaces defining openings 160 and 160' that correspond in location to the openings 94 and 94' when the external manifold is mounted to the internal structure 81 (see FIG. 7). The external manifold 150 is adapted to closely engage the engagement surface 145 as shown in FIG. 14.

Figure 19:
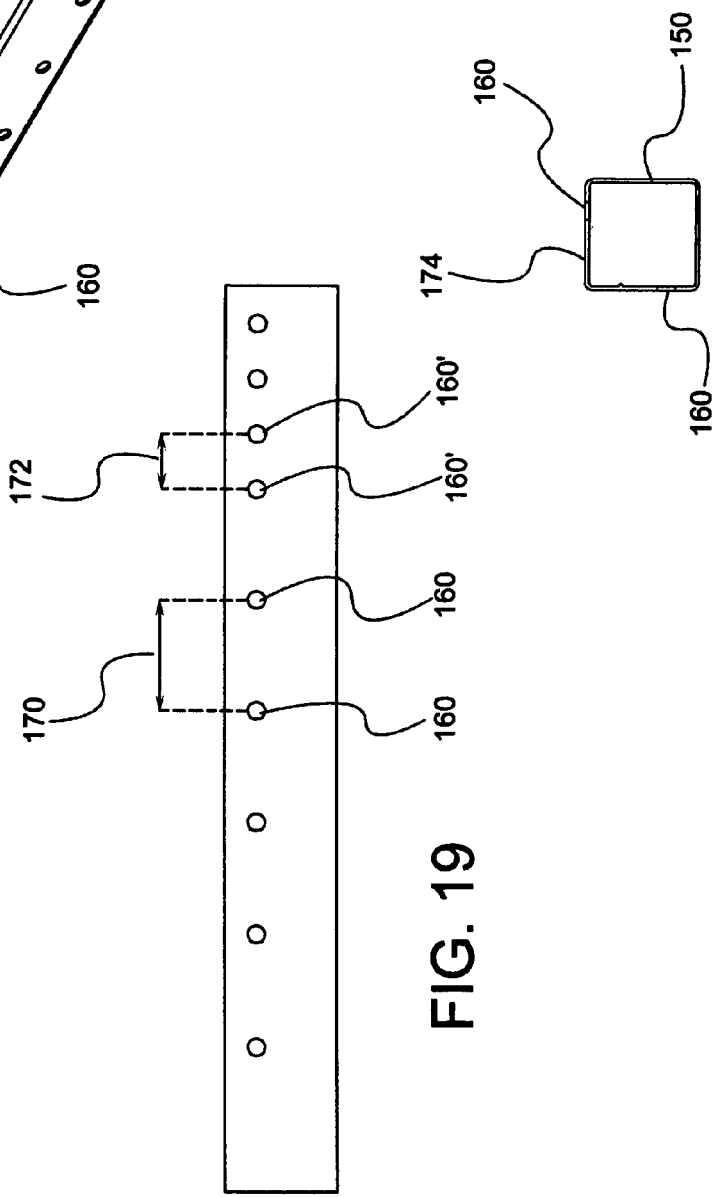
FIG. 19 shows a front view of the external manifold illustrating the various openings and spacings thereof.

As shown in FIG. 19, the openings 160 and 160' are positioned at a distance 170 correlates with the dimension 198 of the internal manifold 90 as shown in FIG. 9. Wherein the central flame post is adapted to espouse flames from a plurality of orifices where the spacing of the orifices are in closer arrangement 172 at a lower region of the flame post than a more distant arrangement 170 at an upper region of the flame post.

Figure 20:
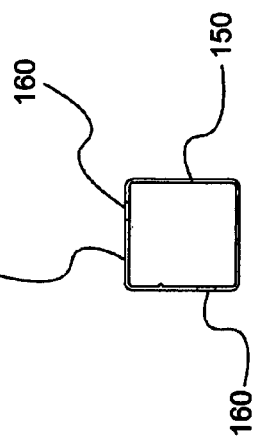
FIG. 20 shows and end view of the external manifold.

As indicated best in FIG. 20, the openings 160 of the external manifold 150 are positioned closer to the corner regions of the front angle portion 174. In general, the front angle portion 174 is positioned toward the front portion of the central chamber indicated at 47 in FIG. 20 and shown in FIG. 5 as well.

It should be noted that the rearward portion of the unit does not have flames expelling therefrom. The flame posts and the oven in general have the front region whereby the flames are expelled to this front region, and the rearward portion does not have flames produced in that portion. Therefore, it is hypothesized that when the chickens rotate to the front portion, heat is transferred to the surface, and as the chickens pass to the rearward chamber portion, some of that heat is conducted to the cooler center region and the outer portion is essentially cooled somewhat so that it does not scorch and burn. Further, it is more aesthetically pleasing to have the flames in the front portion for viewing of the public, such as when the item is used in a store or restaurant.

There will now be a discussion of the second heating assembly 82 as shown in FIG. 5. In general, the second heating assembly 82 is comprised of left and right infrared heaters 84 and 86. In a preferred form, these heaters are the same and the first heater 84 will be described in detail with reference being relative to the second heater 86.

As best shown in the sectional view taken along the lateral axis, the left heater 84 is shown where the heater comprises a housing region 190 and a heating element 192. In one form, the heating element is additionally powered by gas.

The infrared heaters operate at a temperature range of about 1300 degrees Fahrenheit, which produces about a 3-micron wavelength of electromagnetic energy, which is found to be an ideal wavelength and is receptive by food articles containing water. The infrared is at a set temperature and heat transfer rate; however, it can be controlled by turning it on and off at various intervals. For example, at a ten-minute interval, if they are on 80% of the time (i.e. 8 minutes), this is found to be an ideal amount of heat transfer for cooking a chicken. This setting can be adjusted through the control interface 36 as shown in FIG. 1. However, for cooking a food item such as baby back ribs, having the radiant heating on for 30% of the time (i.e. 3 minutes) appears to be ideal. It should be noted that it has been found to be difficult to have vertical members that function properly. Therefore, having oblique extending fins 194 eventually sectionalizes the infrared members so that the heat transfer can be more substantially uniform about a vertical axis to the food items. In general, the lower portion has a inwardly and downwardly extending fin 196 which essentially allows cooler air to run thereunder, and each section has a cooler lower portion and a hotter upper portion, where the hotter upper portion is caused by the upper fin where it has a tendency to contain heat thereunder and expel it inwardly toward the food item. It should be noted that the lower platform 196 has the function of acting like a heat reflector, whereby its angle has a mirror-like effect so that infrared coming off the lower section is rebounded and essentially directed towards the bell in the lowest chicken. This further has an advantage of not boiling the water in the lower portion, which is adapted to contain splattering and dripping fat from the food items. It is estimated that the heat transfer from the various units is approximately 50% from the center flame post, and about 25% from each of the two infrared heating units. It should be noted that the above-noted BTU inputs are the actual input to the whole unit. However, the actual receiving BTUs on the chickens may be higher, such as having 37.5% from each of the infrared units and only 25% from the center flame post, due to the fact that the method of convecting heat to the chickens from the center flame post is not as efficient as through the infrared units.

It should be noted that having any form of vertical cooking apparatus is an inherent challenge, whereby the rising heat, by the nature of the less dense air, creates an inherently unstable stratification from the lower to the upper portion of the heat gradient. Therefore, a few ways to combat this as mentioned above are the heat shield 196 in the bottom to reflect heat from the IR; strategic spacing of the orifices on the heat flame post 80, where the bottom portion of the flame post may have openings 160 set closer to one another to allow more flame propagation to pass therethrough; and further, the overall height should be reasonable where it is found that at an upper range of a 3-foot flame post is the preferred height to properly balance the heat transfer for relatively uniform cooking from the lowest food item in the chamber to the uppermost food item in the central chamber region. An upper range may be a 4-5 foot flame post with a slightly larger chamber area to accommodate food items hung therein. Present analysis indicates that a preferred form is about a 20-inch post when cooking food items such as three chickens stacked upon one another. Of course in a broader range, this would be between 15 and 24 inches approximately.

There are about 50,000 BTUs in the center flame post that are expelled, and approximately 28,000 for each infrared heater. Of course, the amount of heat that is actually transferred to the units is sought to be somewhat less that ratio with respect to the center flame post. Present analysis indicates that one form is throughputting about 50,000 BTUs for the center flame post when natural gas is used, and when using liquid propane, producing about 55,000 BTUs. The total input when the infrared units are on 100% of the time is about 115,000 BTUs with natural gas or liquid propane, whereas the amount of BTU input is altered to accommodate this 115,000 BTU sweet spot. Present analysis indicates that plus or minus 5% from these units produces particularly desirable results.

There will now be a discussion of one method of forming a skewer for a food item with initial reference to FIGS. 21 and 24. In general, a skewer assembly 29 (see FIG. 1A) in one form is comprised of skewer sections 220. FIG. 21 shows an exploded view where a preassembled skewer section is shown. FIG. 23 shows a cross-sectional view of a completed skewer section where the connecting rod 222 is fixedly attached to the stop member 224 at a middle location. The upper location of the connecting rod is fixedly attached to the connecting loop 226. The members 222, 224 and 226 are collectively referred to as the connector 228. Therefore, the connector 228 is permanently attached in one form to the cooking bell 230. The cooking bell 230 as shown in FIG. 21 has a perimeter region 232 and an interior protruding portion 234. The perimeter region 232 operates as a heat receptacle region to absorb heat from the interior chamber of the oven.

The chicken bells 230 are made out of a material which can conduct heat and the lower portion is adapted to receive heat from the various means, such as the infrared heaters, and essentially conduct this heat to the interior portion of the bird where the upper portion is inserted. Further, the upper portion of the connector 228 is adapted to connect to a lower hook 229 of an upper adjacent skewer section 220 so that they can stack in a very desirable spacing. So essentially, not only is there convection heat transfer as well as radiation, but the third possible form of heat transfer is utilized such that conduction can occur, where as previously mentioned, the heat receptacle region around the circumferential area heats up and absorbs heat readily and conducts this heat to the interior portion of the bird, essentially allowing heat to transfer from the inside out as well as from the outside in to fully cook the bird to the desired temperature such as the food code allows which is generally at least 165° F. and can be in the upper ranges of 174° F.-190° F. within a desirable time frame such as an hour (50 to 70 minutes). In one form, the material can be an aluminum metallic material, but of course any material which is adapted to conduct heat effectively can be employed. Aluminum has a heat conductive coefficient which is conducive for the cooking bell 230.

Essentially, the skewer sections 220 are designed for particular food items such as chickens or other fowl that have a hollow interior to allow heat to be conducted therein. Of course other skewered items can be employed such as conventional skewers well known in the art for food items such as baby back ribs and the like.

It should be noted that the underlying fundamental goal of the unit is to have balanced cooking. This includes proper color on the outside of the birds, proper color on the inside of the birds, proper temperature on the inside and outside, and uniformity from the lower bird to the upper bird for a cooking process within a reasonable time parameter such as about one hour. It should be noted that with vertical cooking, you can have various different food items within a unit, whereas with horizontal rotating members where some units are positioned vertically beneath other units as they rotate therearound cross-contamination may occur from fluids dripping from the upper to lower food items.

Figure 25:
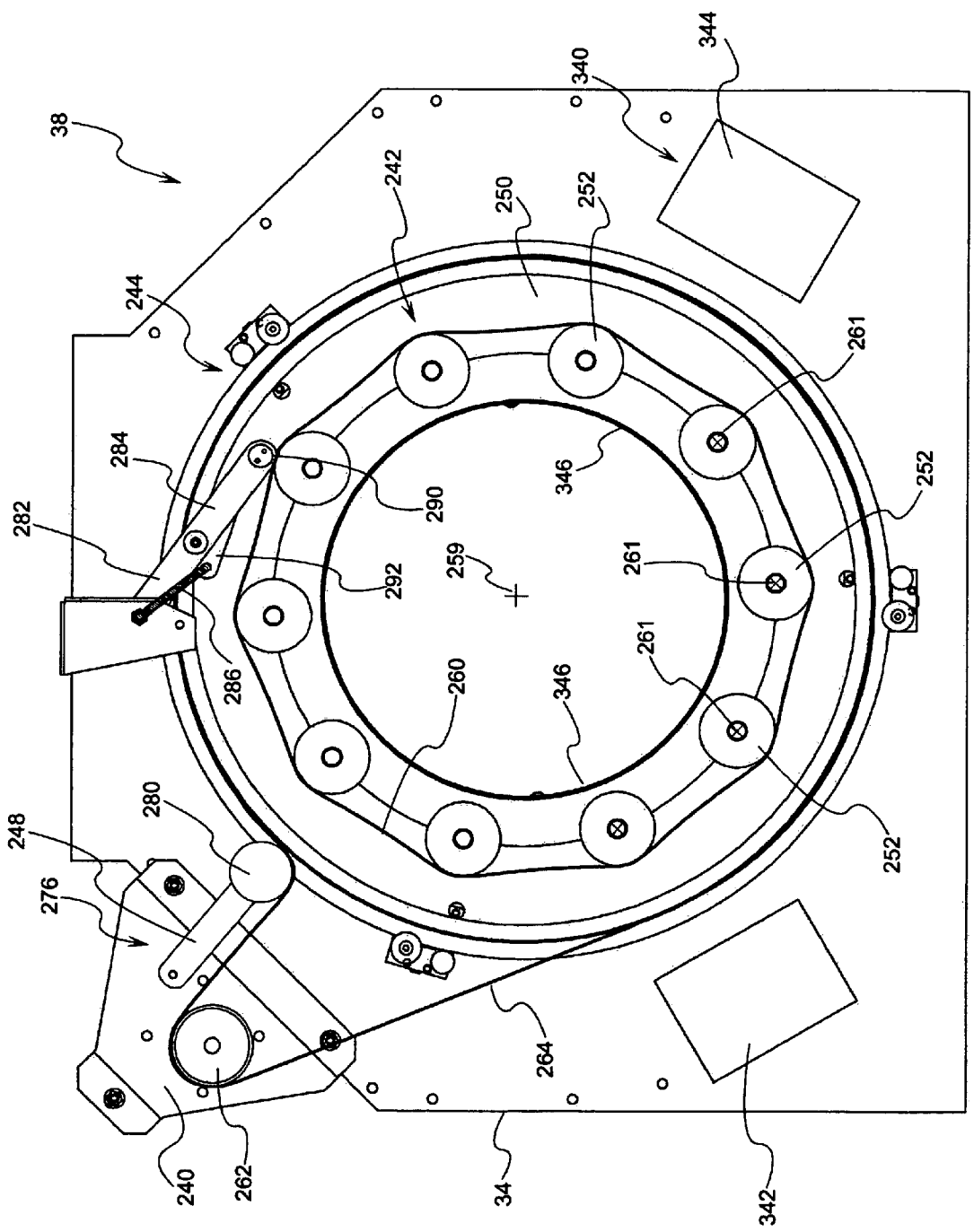
FIG. 25 shows a top view of the drive assembly.

There will now be a discussion of the drive assembly 38 as is best shown in FIG. 25. In one form the drive assembly 38 is secured in the upper portion of the oven 20 within the encasement 34. In general, the drive assembly comprises a drive actuator 240, a rotary system 242 and a positioning assembly 244.

Figure 26:
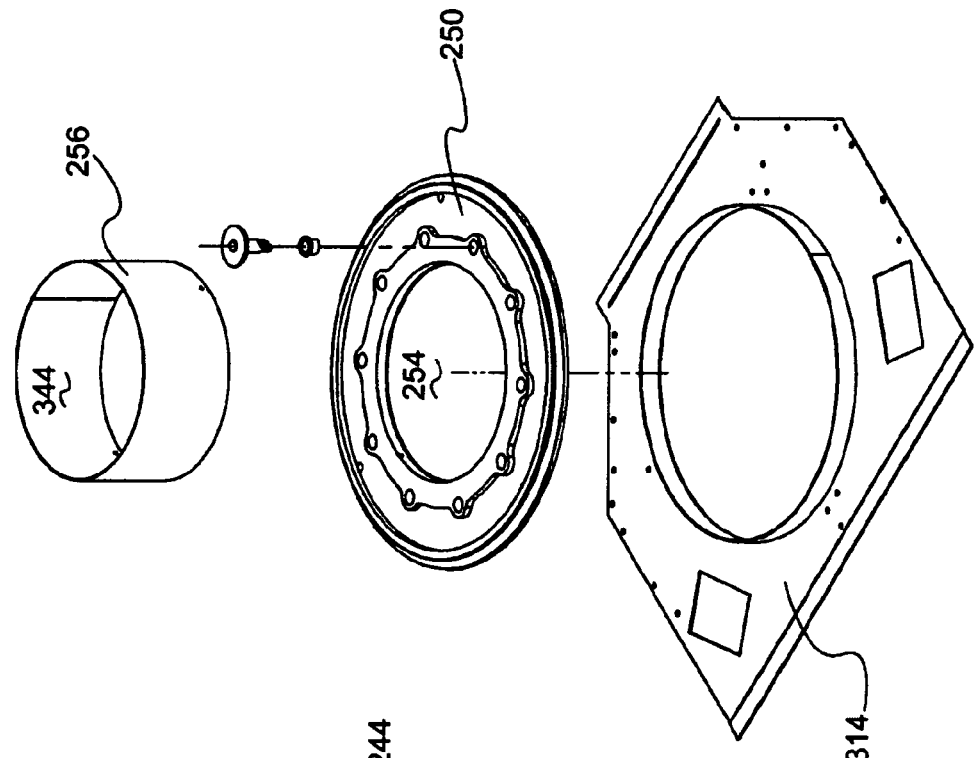
FIG. 26 shows a partial exploded view of the baseplate positioned over the upper housing plate.
Figure 27:
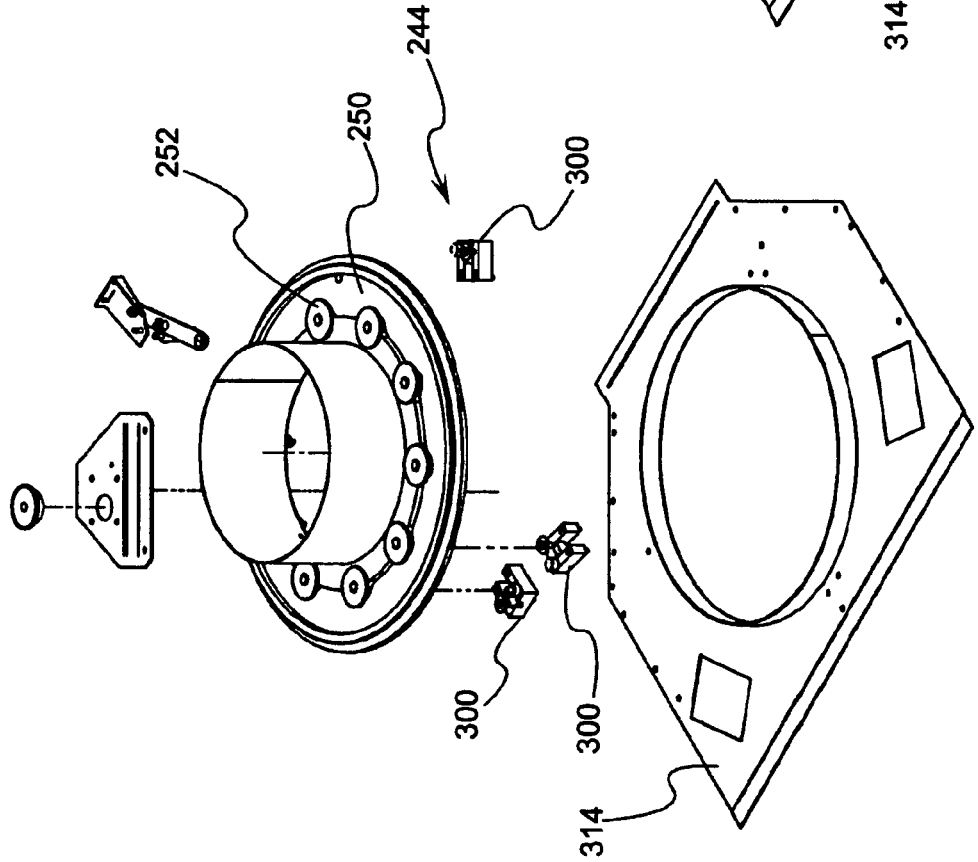
FIG. 27 shows an exploded view of the drive assembly where various positioning members are positioned under the baseplate and adapted to support the same.

The positioning assembly 244 comprises a baseplate 250 where as shown in FIGS. 26 and 27, the baseplate 250 is adapted to house a plurality of drive sprockets 252. The baseplate 250 is adapted to rotate about the central axis 259 as shown in FIG. 25. In one form, the central axis 259 is substantially at the center portion of the emitted flames from the flame post. As shown in FIG. 26, the baseplate 250 has an interior cavity portion 254 that is adapted to allow ventilation from the food items cooked therebelow. The cylindrical chute 256 is adapted to mount within the interior cavity portion 254 to channel the combusted material upwardly through proper ventilation structure. Further, the cylindrical chute aids in preventing cross-contamination of the food items and the various components of the drive assembly 38.

Figure 28:
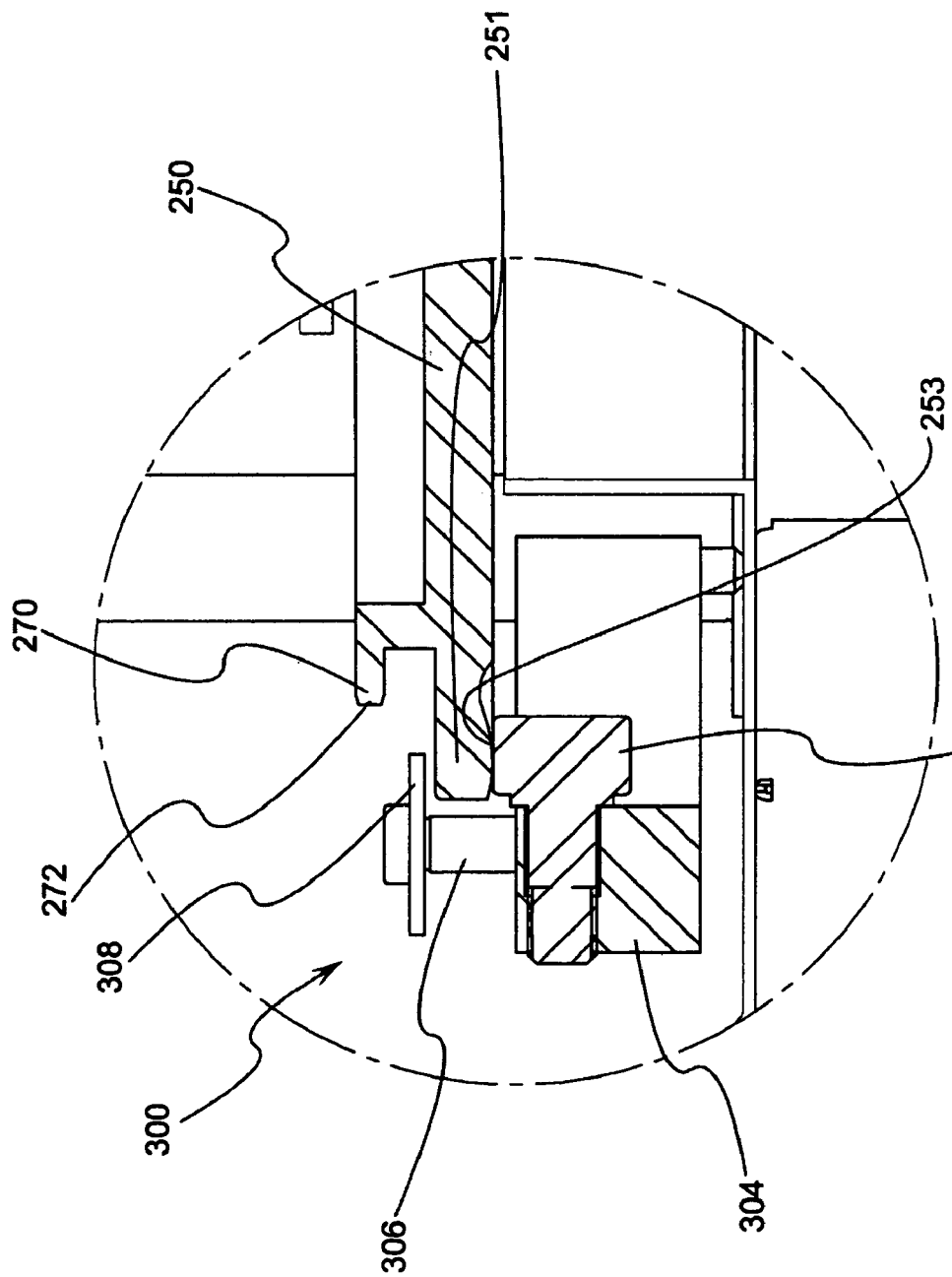
FIG. 28 shows a close up cross-sectional view of the positioning members supporting the perimeter region of the baseplate.

The plurality of drive sprockets 252 (rotary members) are adapted to engage to a static chain indicated at 260. The static chain (static flexible member) 260 is essentially adapted to provide a counter torque amounts the various drive sprockets 252. The drive chain (drive flexible member) 264 is operatively connected to the drive assembly 244. The drive chain 264 rotates in conjunction with the drive wheel 262 at a preferred speed which is controlled by the interface controller described below. The drive assembly 244 comprises an internal motor which in one preferred form is an electric motor well known in the art that is connected by an array of gears (not shown) to the drive wheel 262. The drive chain is attached to a perimeter portion 270 of the baseplate 250 that is best shown in FIG. 28. In one form, the perimeter portion 270 has a smooth distal surface 272 that is adapted to engage the drive chain 264. However, the smooth surface acts somewhat like a clutch where if the downward extending skewers were to hang up in any form, the drive chain 264 would merely slip around the smooth distal surface 272 and provide a certain amount of torque dependent upon the coefficient of friction between the drive chain and the baseplate which is somewhat contingent upon the tension impose thereon. Of course the various chains are defined broadly and could be replaced with an equivalent flexible members that would be known and foreseeable in the art.

Figure 30:
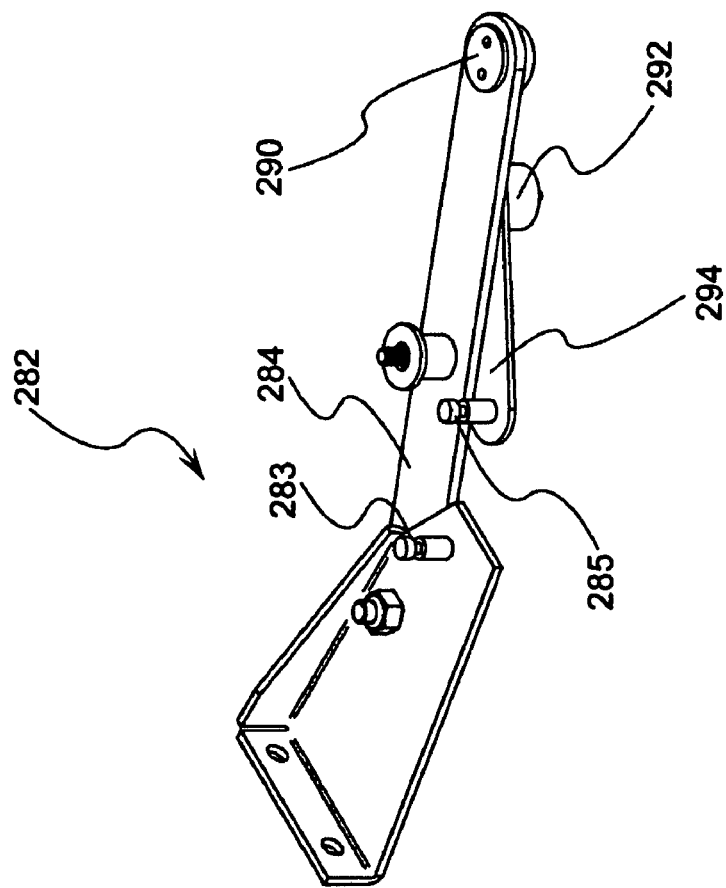
FIG. 30 shows an assembled view of the static tension uptake system.
Figure 29:
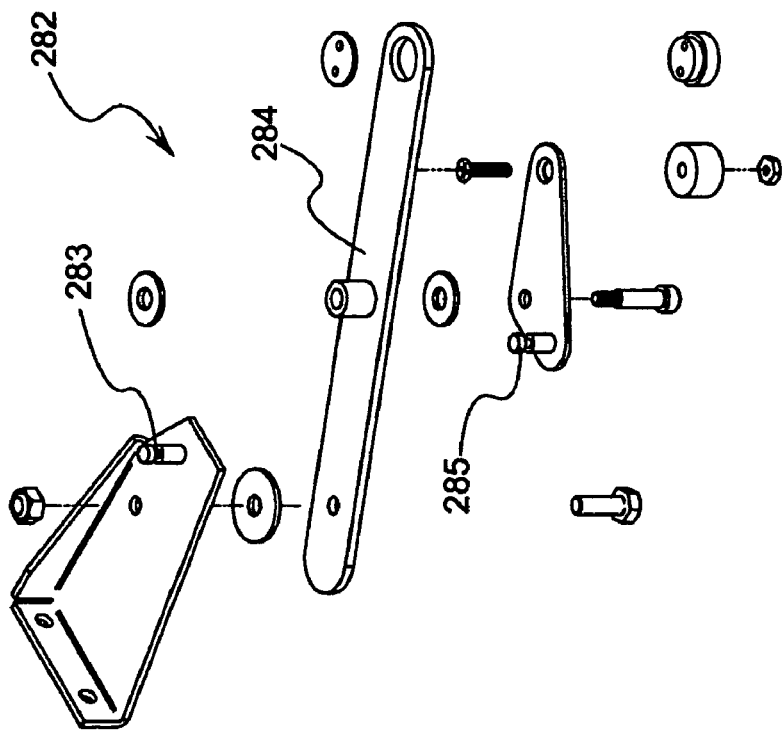
FIG. 29 shows an exploded preassembled view of a static tension uptake system adapted to take up slack within the static chain of the drive assembly.

The tension upon the drive chain 264 is imported by a tension take-up system 276. As shown in FIG. 25, in one form the tension take-up system 276 comprises an extension arm 278 having a freewheel sprocket 280. The heat fluctuation of the baseplate 250 is fairly significant and given that the overall diameter is roughly 18 inches to 36 inches, there is a fair amount of thermal expansion when the baseplate 250 is heated. This expansion is fairly significant and the drive assembly 244 must accommodate for the circumferential increase of the baseplate 250. Further, the static chain 260 must contend with thermal expansion as well where the drive sprockets 252 that are pivotally connected to the baseplate 250 will expand radially outwardly as the temperature of the unit increases. Therefore, the static tension uptake system 282 as shown in FIG. 25 is adapted to accommodate these changes whereby the pivot arm 284 is biased by the spring 286 where the combination of connection point 290 and the contraction of the spring connection points 283 and 285 by the spring 286 shown in and guide wheel 292 are adapted to take up the tension when the unit is at a lower temperature and allow for distal repositioning of the drive sprockets 252 as the unit heats up. As shown in FIGS. 29 and 30, there is an exploded and assembled view of the static tension uptake system 282. The connection point 290 is adapted to fixedly attached to the static chain 260 (the static chain as shown in FIG. 25). The guide wheel 292 is attached to the arm 294 to reposition radially inwardly as the drive sprockets 252 as shown in FIG. 25 rotate therepast. It should be noted that when the baseplate 250 rotates by way of actuation by the drive actuator 240 applying tension through the drive flexible member 264, the rotary members rotate about a skewer axis 261 shown in FIG. 25 by example in a few of the members 252 shown in the lower portion of that figure.

There will now be a discussion of the positioning assembly 244 with initial reference to FIG. 27. As described above, thermal expansion is an issue that must be contended with regard to the baseplate 250. Therefore, a plurality of positioning members 300 are employed that are shown in an exploded view in FIG. 27. In general, the positioning members 300 work in conjunction to operate as a bearing and containment device for the baseplate 250. Referring now to FIG. 28, there is a cross-sectional view of a positioning member 300 interfacing with the baseplate 250 at the perimeter location 251 of the baseplate. In general, the positioning member 300 comprises a support bearing 302 that is pivotally attached to the positioning housing 304. Further attached to the positioning housing is the containment bearing 306 that is orientated in a substantially vertical manner having a flange portion 308 that is adapted to extend over the perimeter location 251 of the baseplate 250.

Figure 32:
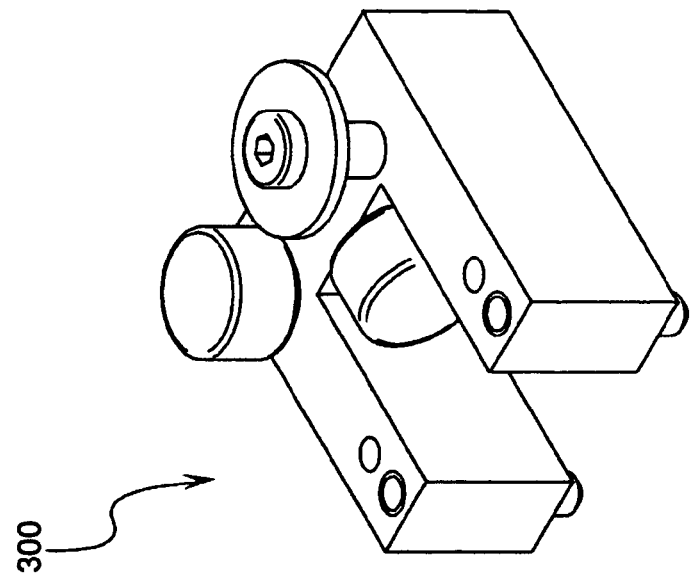
FIG. 32 shows an assembled positioning member.
Figure 31:
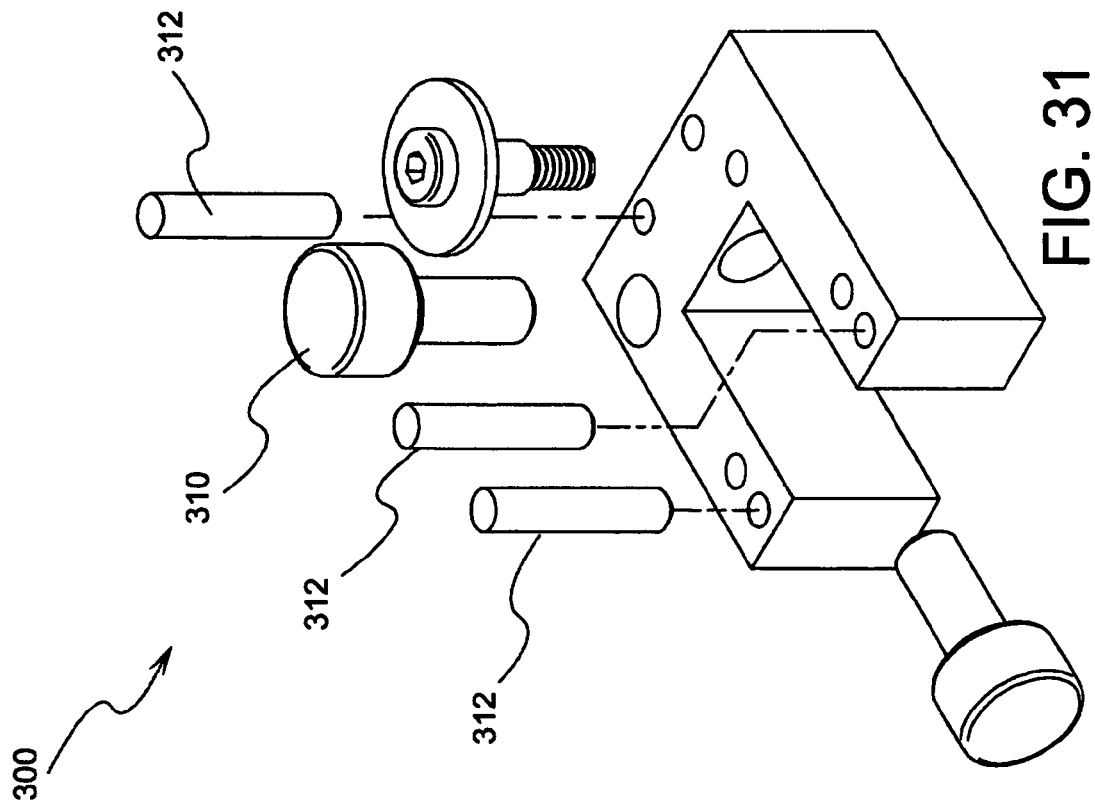
FIG. 31 shows a preassembled exploded view of a positioning member.

The containment member 306 cooperates with the containment bearing 310 as shown in FIG. 31 that is also adapted to be mounted vertically within the positioning housing 304. As shown in FIGS. 31 and 32, the orientation dowels 312 are adapted to mount the positioning members 300 to the upper housing plate 314 as shown in FIGS. 26 and 27.

As further shown in FIG. 27, in a preferred form, three positioning members 300 are employed such that if the upper housing plate 314 is not level, or the thermal expansion of the unit causes any form of vertical deflection between the upper housing plate 314 and the baseplate 250, it does not affect consistent contact with each positioning member 300 when only three are employed. If additional positioning members were employed, there may be a slight rocking effect as the center of gravity shifts on the baseplate as it rotates and three of the four or more positioning members would potentially alternate supporting the baseplate 250.

As further the shown in FIG. 28, the perimeter location of the baseplate 250 has a convex region 253 which allows for a smaller annular surface area of engagement against the support bearing 302. This is desirable to reduce the amount of friction as the baseplate rotates whereby the greater radial distance contact occurs between the perimeter region, the radially inward portion rotates at a lower velocity of the radially outward portion thereby causing a frictional slippage between the baseplate 250 and the support bearing 302. Therefore, the convex surface 253 minimizes the speed discrepancy between the slight inner and outer radial portion that engage the support 302.

Figure 1B:
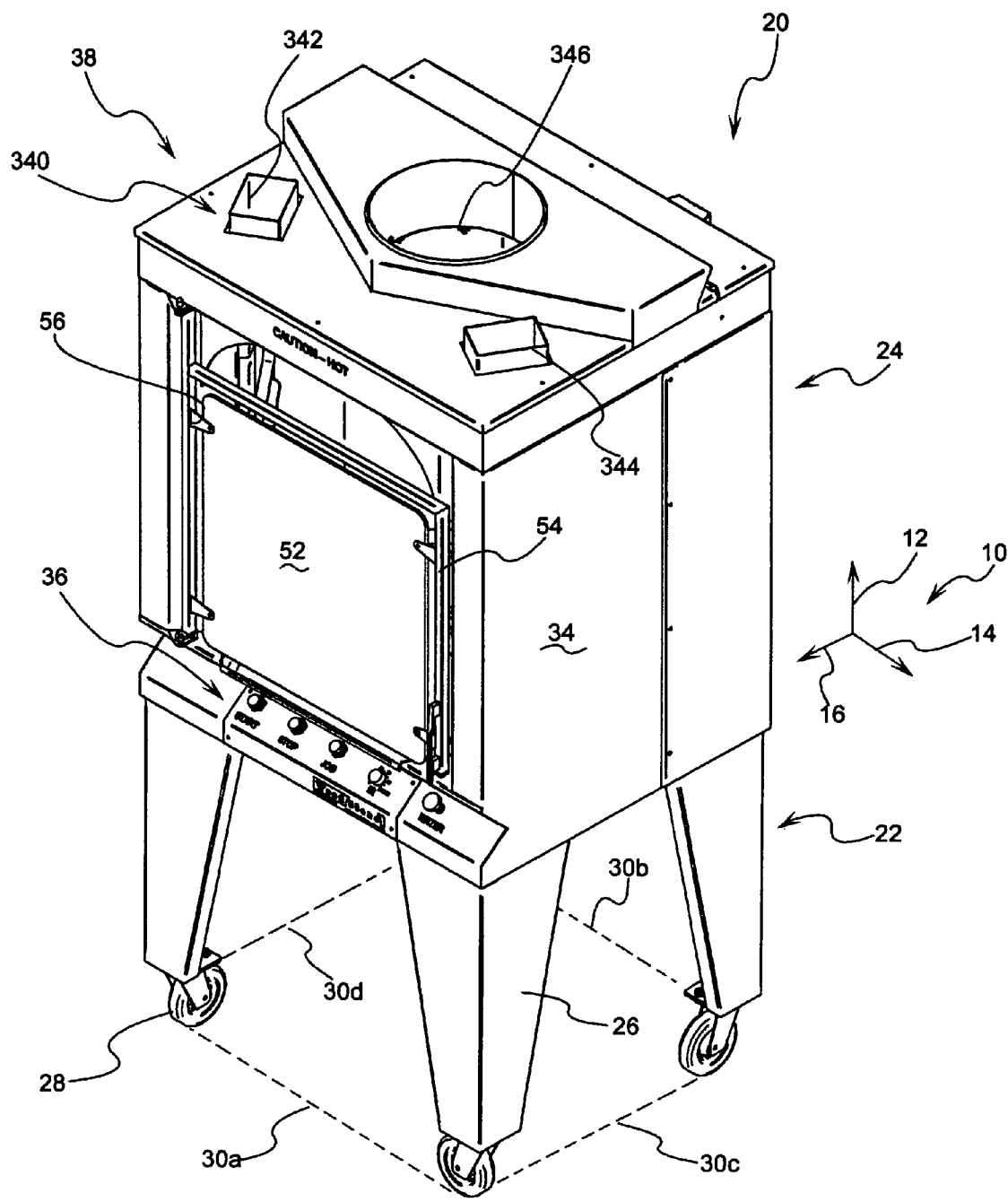
FIG. 1B shows an isometric view of the open flame rotisserie oven with a door in place.

The ventilation system 340 as shown in FIGS. 1A and 1B comprises second heater vents 342 and 344 that are positioned above the second heating assembly 82 as shown in FIG. 5. Further, a central vent 346 is positioned in the center region of the drive assembly as shown in FIG. 25 such that the cylindrical chute 256 as shown in FIG. 26 is adapted to define the central vent.

With the forgoing technical description in mind, there will now be a discussion of a few actual cooking examples with a machine similar to that as indicated at 20. Below are various test examples where various parameters are adjusted at different cooking results. Therefore, as shown as Example 1, there is shown a start temperature, finish temperature, and rest temperature after 20 minutes displayed in the three columns. The cook time was one hour and five minutes from the start temperature to the finish temperature. The various rows indicate chickens at the upper and lower regions and their respective temperatures. Some comments related to example is that the coolest point found was between 170-175 degrees Fahrenheit, which was found near the breastbone taken from the upper part of the chicken driven downwardly and towards the center region. Down in the thigh region, taken from the right front portion of the breast driven transversely rearwardly towards the thigh was approximately 183-185 degrees Fahrenheit. Present analysis indicates that being below 170 degrees will result in an undercooked fat portion having potential bloodlines in that area. Therefore, in one form it is desirable to have at least 170 degrees in the interior portion, at a minimum. Therefore, this experiment showed a potentially lower acceptable range in one form, whereby the coolest point being between 170-175 degrees was a lower roughly estimate cook time.

| EXAMPLE 1 | | | |
|---|---|---|---|
| | Start Temperature (F.) | Finish Temperature (F.) | Temp. after 20 Min (F.) |
| Upper Chicken | 41° | 177° | 160° |
| Middle Chicken | 41° | 181° | 163° |
| Lower Chicken | 41° | 164° | 152° |

Example 1 had a center flame post with fifteen open jets with upper and lower deflectors on the infrared unit. Each bird was between 3.78-3.88 pounds.

In Example 2, two jets were added in the bottom portion of the flame post to make 17 jets. The input times are disclosed below. It should be noted that the initial temperature was somewhat higher than the previous example (approximately 8 degrees Fahrenheit); however, the cook time was lowered approximately 10 minutes to 55 minutes, and most notable is the distribution of the temperature from the upper to the lower which is more substantially similar with a two-degree maximum variance, whereas the lower part of the bird was actually hotter than the temperature taken at the breast region. The results looked great, with a good finish on the bird, and present analysis indicates that two jets in the lower portion adding additional heat transfer therefrom, contributed to the more even cooking than in the first example. It should be noted that the combustible gas in examples 1 and 2 was natural gas.

| EXAMPLE 2 | | |
|---|---|---|
| | Start Temperature (F.) | Finish Temperature (F.) |
| Upper Chicken | 49° | 175° |
| Middle Chicken | 49° | 176° |
| Lower Chicken | 49° | 177° |

In Example 3, two birds were cooked in the uppermost portion and one in the lowermost portion. As shown below, after 50 minutes the top bird was 170 degrees, which is considered done; however, the lower bird was 140 degrees, which is not done.

| EXAMPLE 3 | | |
|---|---|---|
| | Temperature at 50 min (F.) | Temperature at 60 minutes (F.) |
| Upper Chicken | 170° | 180° |
| Lower Chicken | 140° | 160° |

Example 4 was executed with a wind guard in the front lower portion of the glass. There was a door used in both examples 3 and 4, but in Example 4 the wind guard deflector was present in the lower portion to keep heat therein and help prevent incoming cool air from entering that lower front portion, which would of course affect the heat transfer to the lower bird. As you can see in this Example, after 50 minutes both birds were done with the times given below. It should be noted that Examples 3 and 4 were both fabric-type infrared burners.

| EXAMPLE 4 | |
|---|---|
| | Temperature at 50 min (F.) |
| Upper Chicken | 180° |
| Lower Chicken | 178° |

Example 5 shows a variation from Examples 3 and 4 above, whereby the post was moved back three inches and the ceramic infrared was raised two inches. This seemed to aid in reducing carbon from the yellow flames propagating from the center flame post. The cook times were approximately one hour for the two birds, and they both came out at about 170 degrees.

EXAMPLE 5

| | Temperature at 50 min (F.) |
|---|---|
| Upper Chicken | 170° |
| Lower Chicken | 170° |

Example 6 shows the use of propane, whereas 63,000 BTUs were expelled from the center post, 4.5 pound chickens were cooked at one hour up to 180 degrees for the top bird. The use of propane in this example is one different factor from those above. The space between the chickens is the same, but the skewer assembly was dropped down from 0.75 inch relative to the heating elements (i.e. the center posts and the burners).

EXAMPLE 6

| | Temperature at 50 min (F.) |
|---|---|
| Upper Chicken | 180° |
| Lower Chicken | 170° |

The above examples are for illustration purposes and not intended to limit the invention. Further, while the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A vertically orientated rotisserie cooking oven operatively configured to cook food items having an external surface and an internal region, the oven comprising:
   a. a housing having a central chamber comprising a high radiant energy zone,
   b. an access panel positioned on the housing to provide access to a central chamber,
   c. a substantially vertically orientated center flame post comprising a plurality of fuel jets,
   d. a drive system having rotary members operatively configured to rotate about a center axis and about a skewer axis, the rotary members having skewer items operatively configured to have the food items positioned thereon,
   e. a secondary heat source positioned at a peripheral location within the chamber, wherein the secondary heat source is operatively configured to provide heat within the central chamber at the high radiant energy zone,
   f. whereas the food items positioned in the central chamber pass through the high radiant energy zone between the center flame post and the secondary heat source and these food items can be transferred thereto from the central region of the chamber through the access panel,
   g. whereby the jets comprise a mixing chamber having a diameter between 0.0905 inches and 0.1905 inches and a flow control orifice positioned in a rearward portion of the mixing chamber having a diameter between 0.019 inches and 0.029 inches with an air intake diameter for two air intake ports between 0.085 inches and 0.120 inches in communication with the mixing chamber and is operatively configured to combust liquid propane.

2. The vertically orientated rotisserie cooking oven as recited in claim 1 where the housing has forward and lateral outer dimensions less than 30 inches by 36 inches.

3. The vertically orientated rotisserie cooking oven as recited in claim 1 whereas the secondary heat source comprises first and second infrared heaters.

4. The vertically orientated rotisserie cooking oven as recited in claim 3 where a control system is employed to activate a secondary heat source for a period of time and deactivate the secondary heat source for a period of time during a cooking cycle for the food items.

5. The vertically orientated rotisserie cooking oven as recited in claim 3 whereby a water entrapment region is provided in the lower portion of the chamber and heat from the first and second infrared heaters is operatively configured to produce water vapor to increase the relative humidity in the central chamber.

6. The vertically orientated rotisserie cooking oven as recited in claim 1 whereby the flame jets are not directed toward the rearward portion of the housing to allow the food items to pass through a low radiant energy zone within the central chamber.

7. The claim as recited in claim 6 wherein heat from a surface of the food item is allowed to transfer to an inner portion of the food item while being positioned in the low radiant energy zone.

8. The vertically orientated rotisserie cooking oven as recited in claim 1 whereas the food items have a central chamber region and the skewers comprise a heating bell having a central upper protrusion and a lower perimeter region that is employed where the central upper protrusion is positioned in a central chamber region of the food item and the lower perimeter region is operatively configured to absorb heat from the chamber area of the housing.

9. The vertically orientated rotisserie cooking oven as recited in claim 8 wherein the heating bell is made from a metallic thermally conductive material.

10. The vertically orientated rotisserie cooking oven as recited in claim 8 where the food item is a chicken and the central upper protrusion of the heating bell is operatively configured to be positioned in the central cavity area of the chicken to conduct heat therein and maintain a higher moisture content when the chicken reaches a desired fully cooked temperature than if the cooking bell were not used to cause the chicken to reach a desired fully cooked temperature.

11. The vertically orientated rotisserie cooking oven as recited in claim 10 where the desired fully cook temperature is at least 165° F. taken at or near the breast region of the chicken and the heating bell facilitates cooking from the central cavity area of the chicken.

12. The vertically orientated rotisserie cooking oven as recited in claim 1 whereas two or more food items are operatively configured to be positioned in a substantially vertically orientated manner and rotate about the central axis and the skewer axis.

13. The vertically orientated rotisserie cooking item as recited in claim 12 where the upper vertically oriented food item is within 5° F. internal temperature from the lower food items positioned thereunder when the cooking operation is complete.

14. The vertically orientated rotisserie cooking oven as recited in claim 1 whereby the drive system comprises a drive sprocket attached to a baseplate that rotates the rotary members about the central axis where the baseplate is frictionally engaged to the drive chain and allows the drive chain to slide with respect to the baseplate if a counter torquing force acts upon the baseplate.

15. The vertically orientated rotisserie cooking oven as recited in claim 14 where the baseplate is positioned upon three positioning members that allow for thermal expansion of the baseplate during a cooking process.

16. The vertically orientated rotisserie cooking oven as recited in claim 14 whereby a static chain is operatively connected to the rotary members and provides rotation of the rotary members about the skewer axis.

17. The vertically orientated rotisserie cooking as recited in claim 1 whereby a plurality of rotary members are employed such that different types of food items are positioned on different rotary members and cross-contamination from drippings from one food item to another food item does not occur.

18. The vertically orientated rotisserie cooking oven as recited in claim 1 where the skewer axis is approximately 6.5-8.5 inches from the secondary heater.

19. A method of cooking a food item providing the steps of:
 a. positioning the food item on a skewer and positioning the skewer upon a rotary member the food item having an extra or surface and an internal portion,
 b. having the rotary member provide a connection portion where the skewer is positioned in a central chamber region of a housing, the housing having reasonable heat retention capabilities to maintain heat within the chamber region for purposes of cooking,
 c. providing a central flame post to disperse heat therefrom where the flame post has a plurality of jets to produce a visible flame,
 d. providing a secondary heat source where the path of the food item is through a high radiant energy zone and a low radiant energy zone,
 e. providing motion of the food items about a central axis and additional rotation about a rotary axis of the rotary member,
 f. where the rotational path of the food item is such that the center flame post is located in the interior portion of the rotational path and the secondary heat source is positioned in the outer portion of the rotational path whereas the path of the food items between the center flame post and the secondary heat source provides the high radiant energy zone whereby passing the food through the low radiant energy zone whereby heat from the external surface of the food item is transferred to the internal portion of the food item where there is less heat transfer to the external surface of the food item in the low radiant energy zone then when the food item is in the high radiant energy zone whereby the jets comprise a mixing chamber having a diameter between 0.765 inches and 0.1365 inches and a flow control orifice positioned in a rearward portion of the mixing chamber having a diameter between 0.021 inches and 0.041 inches with an air intake diameter between 0.035 inches and 0.050 inches in communication with the mixing chamber and is operatively configured to combust natural gas.

20. The method of cooking as recited in claim 19 whereby a deflector shield is provided in a lower portion of the secondary heater to reflect heat upwardly toward a lower region of the food item.

21. The method of cooking as recited in claim 19 whereby a water entrapment region is provided in a lower region of the chamber to collect drippings from the food items as they are cooked.

22. The method of cooking as recited in claim 21 whereby the water entrapment region is operatively configured to provide water to be introduced to the water entrapment region to transfer drippings from the food items out of the central chamber.

23. The method of cooking as recited in claim 19 whereby the central flame post has a removable central flame post cover with a plurality of orifices coinciding in position with the position of the jets.

24. The method as of cooking as recited in claim 19 whereby the food item is positioned on the skewer where it is positioned above another food item and the heat transfer from the central flame post and the secondary heat source are substantially similar for both food items so they are proximately cooked to the same internal temperature in the approximate same amount of time.

25. The method of cooking as recited in claim 24 whereby the two food items are within 5° F. from one another when they are completed in the cooking cycle.

26. The method as recited in claim 19 whereby the secondary heat source is an infrared heater and is controlled by a control module whereby a percentage of time in a given time interval is provided so the secondary heat source is only on for that percentage of time in said interval.

27. The method as recited in claim 19 whereby a portion of the chamber defines a low radiant energy zone that is provided along the circular path of the food item whereby the heat transfer to the surface of the food item in this region is lower than that of a high radiant energy zone and heat from the outer surface of the food item is allowed to conduct to the inner portion of the food item without too large of a temperature gradient from the inner to the outer portions of the food item to cause the outer surface of the food item to burn.

28. The method of cooking as recited in claim 19 whereby the flame is substantially completely combusted before reaching the food item.

29. The method of cooking as recited in claim 19 whereby the jets comprise a mixing chamber having a diameter between 0.08 inches and 0.126 inches and a flow control orifice positioned in a rearward portion of the mixing chamber having a diameter between 0.021 inches and 0.041 inches with an air intake diameter between 0.035 inches and 0.050 inches in communication with the mixing chamber and is operatively configured to combust natural gas.

30. The method of cooking as recited in claim 1 whereby the jets comprise a mixing chamber having a diameter between 0.99 inches and 0.15 inches and a flow control orifice positioned in a rearward portion of the mixing chamber having a diameter between 0.019 inches and 0.029 inches with an air intake diameter for two air intake ports between 0.085 inches and 0.120 inches in communication with the mixing chamber and is operatively configured to combust liquid propane.

31. A vertical orientated central flame oven operatively configured to cook food items with a central open cavity, the vertically orientated central flame oven comprising:
 a. a housing having a central cooking chamber operatively configured to maintain heat therein and provide ventilation in an upper portion of the central cooking chamber,
 b. a central flame post operatively configured to espouse flames from a plurality of orifices where the spacing of the orifices are in closer arrangement at a lower region of the flame post than at an upper region of the central flame post, a secondary heat source configured to provide infrared heat within the central cooking chamber, c. where the vertically orientated central flame oven comprises a plurality of food item hanging members that are operatively configured to rotate about the central flame post, the food item hanging members comprising cooking bells having an interior protruding portion and a perimeter region where the interior protruding portion is operatively configured to be positioned in the central open cavity of the food item and heat from the central flame post and the secondary heat source is operatively configured to be transferred from the perimeter region to the interior region to conduct heat to the central open cavity of the food item, d. whereby the jets comprise a mixing chamber having a diameter between 0.0905 inches and 0.1905 inches and a flow control orifice positioned in a rearward portion of the mixing chamber having a diameter between 0.019 inches and 0.029 inches with an air intake diameter for two air intake ports between 0.085 inches and 0.120 inches in communication with the mixing chamber and is operatively configured to combust liquid propane.

32. The vertically oriented central flame oven as recited in claim 31 where the secondary heat source is positioned in a perimeter region of the central cooking chamber to provide radiant heat to the food items.

33. The vertically orientated central flame oven as recited in claim 32 where the secondary heat source comprises left and right infrared heating members having a downwardly extending fan in the lower portion of each left and right infrared heating members to redirect a portion of the radiant heat.

34. The vertically orientated central flame oven as recited in claim 33 whereby the lower portion of the central cooking chamber comprises a water pool to skim drippings from the food items where the water pool is operatively configured to absorb heat from the secondary heater to increase the humidity in the central cooking chamber.

35. The vertically orientated central flame oven as recited in claim 31 whereby the food item hanging members are further operatively configured to rotate about a central skewer axis as well as about the central flame post.

36. An open flame oven comprising:
a. a housing having a central cooking area,
b. a flame post positioned in a central region of the central cooking area, the flame post operatively configured to emit a visible flame therefrom,
c. a drive assembly comprising a drive actuator operating a drive flexible member that is frictionally engaged to a baseplate, the baseplate operatively configured to rotate about a central axis, a plurality of rotary members rotationally mounted on the baseplate where the rotary members are operatively configured to engage a static flexible member whereas when the baseplate rotates by way of actuation by the drive actuator applying tension through the drive flexible member, the rotary members rotate about a skewer axis and the baseplate is in frictional engagement with the drive flexible member to allow slippage therebetween if a countering torque is applied to the base member,
d. a secondary heater directed to supply radiant heat to the central cooking area for purposes of transferring heat to the central cooking area,
e. whereby the jets comprise a mixing chamber having a diameter between 0.0765 inches and 0.1365 inches and a flow control orifice positioned in a rearward portion of the mixing chamber having a diameter between 0.021 inches and 0.041 inches with an air intake diameter between 0.035 inches and 0.050 inches in communication with the mixing chamber and is operatively configured to combust natural gas.

37. The open flame oven as recited in claim 36 whereby the secondary heater is actuated for a certain percent of time and be deactivated for a certain percent of time during a cooking process.

38. The open flame oven as recited in claim 37 where by a heat shield is positioned in a lower portion of the secondary heater to reflect heat therefrom.

39. The open flame oven as recited in claim 36 where the baseplate is positioned upon three positioning members that allow for thermal expansion of the baseplate.

40. The open flame oven as recited in claims 38 whereby the central cooking area comprises a low radiant energy zone and a high radiant energy zone whereby the rotary members are operatively configured to the vertically orientated in a location where a skewer axis of the rotary members passes through the high radiant energy zone and the low radiant energy zone by way of rotation of the drive assembly.

41. The vertically orientated rotisserie cooking oven as recited in claim 1 wherein the drive system further comprises a motor mechanism which provides driving force and the drive system is positioned vertically above the skewer items.

42. A method of cooking a food item providing the steps of:
a. positioning the food item on a skewer and positioning the skewer upon a rotary member,
b. having the rotary member provide a connection portion where the skewer is positioned in a central chamber region of a housing, the housing having reasonable heat retention capabilities to maintain heat within the chamber region for purposes of cooking,
c. providing a central flame post to disperse heat therefrom where the flame post has a plurality of jets to produce a visible flame whereby the jets comprise a mixing chamber having a diameter between 0.0765 inches and 0.1365 inches and a flow control orifice positioned in a rearward portion of the mixing chamber having a diameter between 0.021 inches and 0.041 inches with an air intake diameter between 0.035 inches and 0.050 inches in communication with the mixing chamber and is operatively configured to combust natural gas,
d. providing a secondary heat source where the path of the food item is through a high radiant energy zone and a low radiant energy zone,
e. providing motion of the food items about a central axis and additional rotation about a rotary axis of the rotary member,
f. where the rotational path of the food item is such that the center flame post is located in the interior portion of the rotational path and the secondary heat source is positioned in the outer portion of the rotational path.

43. The method as recited in claim 42 whereby the secondary heat source is an infrared heater and is controlled by a control module whereby a percentage of time in a given time interval is provided so the secondary heat source is only on for that percentage of time in said interval.

44. A method of cooking a food item providing the steps of:
a. positioning the food item on a skewer and positioning the skewer upon a rotary member,
b. having the rotary member provide a connection portion where the skewer is positioned in a central chamber region of a housing, the housing having reasonable heat retention capabilities to maintain heat within the chamber region for purposes of cooking, c. providing a central flame post to disperse heat therefrom where the flame post has a plurality of jets to produce a visible flame whereby the jets comprise a mixing chamber having a diameter between 0.0905 inches and 0.1905 inches and a flow control orifice positioned in a rearward portion of the mixing chamber having a diameter between 0.019 inches and 0.029 inches with an air intake diameter for two air intake ports between 0.085 inches and 0.120 inches in communication with the mixing chamber and is operatively configured to combust liquid propane, d. providing a secondary heat source where the path of the food item is through a high radiant energy zone and a low radiant energy zone, e. providing motion of the food items about a central axis and additional rotation about a rotary axis of the rotary member, f. where the rotational path of the food item is such that the center flame post is located in the interior portion of the rotational path and the secondary heat source is positioned in the outer portion of the rotational path.

45. The method of cooking as recited in claim 44 whereby a deflector shield is provided in a lower portion of the secondary heater to reflect heat upwardly toward a lower region of the food item.

* * * * *